(12) United States Patent
Osuka et al.

(10) Patent No.: US 11,954,385 B2
(45) Date of Patent: Apr. 9, 2024

(54) EDITING DEVICE EDITING PRINT DATA VIA DISPLAY DEVICE FOR CREATING COMPOSITE LABEL WITH PRINTING DEVICE

(71) Applicant: BROTHER KOGYO KABUSHIKI KAISHA, Nagoya (JP)

(72) Inventors: Misato Osuka, Nagoya (JP); Ryuichi Kanda, Nagoya (JP); Masashi Iwamoto, Nagoya (JP); Yuichiro Suzuki, Komaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/065,781

(22) Filed: Dec. 14, 2022

(65) Prior Publication Data
US 2023/0205469 A1 Jun. 29, 2023

Related U.S. Application Data

(63) Continuation of application No. 17/106,071, filed on Nov. 28, 2020, now Pat. No. 11,537,340.

(30) Foreign Application Priority Data

Nov. 29, 2019 (JP) .................................. 2019-217035

(51) Int. Cl.
*G06F 3/12* (2006.01)
(52) U.S. Cl.
CPC .......... *G06F 3/1243* (2013.01); *G06F 3/1208* (2013.01); *G06F 3/1256* (2013.01)
(58) Field of Classification Search
CPC .... G06F 3/1243; G06F 3/1208; G06F 3/1256; G06F 3/1204; G06F 3/1292;
(Continued)

(56) References Cited

U.S. PATENT DOCUMENTS

| 6,196,740 B1 | 3/2001 | Yamaguchi et al. |
| 9,237,274 B2 | 1/2016 | Russell |

(Continued)

FOREIGN PATENT DOCUMENTS

| CN | 1847010 A | 10/2006 |
| CN | 101678682 A | 3/2010 |

(Continued)

OTHER PUBLICATIONS

Chinese Office Action for the related Chinese Patent Application No. 202011367362.6 dated Feb. 2, 2023.
(Continued)

*Primary Examiner* — Akwasi M Sarpong
*Assistant Examiner* — Michael L Burleson
(74) *Attorney, Agent, or Firm* — KENEALY VAIDYA LLP

(57) ABSTRACT

An editing device is configured to edit print data including first print data and second print data via a display device for creating a composite label with a printing device. The composite label includes a first label and a second label and is created by superposing the second label over the first label. A set of program instructions, when executed by a controller of the editing device, causes the editing device to perform displaying an editing screen on the display device. The editing screen has a first region, a second region, and a composite region. The displaying displays a first label image based on the first print data in the first region, a second label image based on the second print data in the second region, and a composite label image formed by superposing the second label image over the first label image in the composite region.

10 Claims, 18 Drawing Sheets

(58) Field of Classification Search
CPC .... G06F 3/1203; G06F 3/1244; G06F 3/1251; B41J 3/4075; B41J 2/21; B41J 2/2132
See application file for complete search history.

(56) References Cited

U.S. PATENT DOCUMENTS

| | | | |
|---|---|---|---|
| 2002/0197090 A1* | 12/2002 | Akaiwa | B41J 3/4075 400/615.2 |
| 2006/0228678 A1 | 10/2006 | Tanaka et al. | |
| 2009/0148620 A1* | 6/2009 | Petermann | B41F 23/0453 427/511 |
| 2010/0040399 A1 | 2/2010 | Van Pottelberghe et al. | |
| 2014/0281937 A1 | 9/2014 | Jacobs et al. | |
| 2015/0206347 A1 | 7/2015 | Russell | |
| 2016/0246555 A1 | 8/2016 | Tsuji | |
| 2018/0089902 A1* | 3/2018 | Zhu | B41J 3/4075 |
| 2019/0232680 A1 | 8/2019 | Shinagawa | |

FOREIGN PATENT DOCUMENTS

| | | |
|---|---|---|
| CN | 102033861 A | 4/2011 |
| CN | 105144078 A | 12/2015 |
| CN | 108416412 A | 8/2018 |
| JP | H04-022666 A | 1/1992 |
| JP | 2003-001896 A | 1/2003 |
| JP | 2009-039986 A | 2/2009 |
| JP | 2010-017937 A | 1/2010 |
| JP | 2011-037029 A | 2/2011 |
| JP | 4730203 B2 | 7/2011 |
| JP | 2012-073700 A | 4/2012 |
| JP | 2013-159470 A | 8/2013 |
| JP | 2014-000814 A | 1/2014 |
| JP | 2014-174702 A | 9/2014 |

OTHER PUBLICATIONS

Office Action for the related Japanese Patent Application No. 2019-217035 dated Jul. 25, 2023.

* cited by examiner

FIG. 17A

| COLOR RECORD NUMBER | PRINTING COLOR | TAPE COLOR | TRANSMITTANCE | |
|---|---|---|---|---|
| 1 | BLACK | TRANSPARENT | 98% | ← 34A(34) / 39A |
| 3 | GREEN | TRANSPARENT | 98% | 39C |
| 4 | BLACK | TRANSLUCENT WHITE | 70% | 39D |
| 6 | GREEN | TRANSLUCENT WHITE | 70% | 39F |
| 10 | GREEN | BLACK | 0% | 39K |

FIG. 17B

| COLOR RECORD NUMBER | PRINTING COLOR | TAPE COLOR | TRANSMITTANCE | |
|---|---|---|---|---|
| 1 | BLACK | TRANSPARENT | 98% | ← 34 / 39A |
| 2 | RED | TRANSPARENT | 98% | 39B |
| 4 | BLACK | TRANSLUCENT WHITE | 70% | 39D |
| 5 | RED | TRANSLUCENT WHITE | 70% | 39E |

FIG. 17C

| COLOR RECORD NUMBER | PRINTING COLOR | TAPE COLOR | TRANSMITTANCE | |
|---|---|---|---|---|
| 1 | BLACK | TRANSPARENT | 98% | ← 34B(34) / 39A |
| 4 | BLACK | TRANSLUCENT WHITE | 70% | 39D |

EDITING DEVICE EDITING PRINT DATA VIA DISPLAY DEVICE FOR CREATING COMPOSITE LABEL WITH PRINTING DEVICE

REFERENCE TO RELATED APPLICATIONS

This application is a continuation of U.S. patent application Ser. No. 17/106,071, filed on Nov. 28, 2020, which claims priority from Japanese Patent Application No. 2019-217035 filed on Nov. 29, 2019. The entire content of the aforementioned applications is incorporated herein by reference.

BACKGROUND ART

Technical Field

The present disclosure relates to an editing device.

Background

A printing system known in the art enables a user creating a composite label formed by superposing a plurality of tapes to check the results of the superposed product prior to printing the individual tapes. The conventional printing system is provided with a tape printing device and an image displaying device. The tape printing device prints images acquired from the image displaying device on corresponding tapes. The image displaying device enables the user to edit a tape print image showing a print image arranged on the tape prior to actually printing the tape with the tape printing device. The image displaying device is provided with a display. An editing screen is displayed on the display, and the user edits a tape print image in the editing screen. An editing screen is provided individually for each tape print image. The editing screen also has a composite image display screen for displaying a composite image, which is the result of superposing a plurality of tape print images. An image display tab is used to switch among editing screens. By operating the image display tab, the user can selectively display each of the tape print images and the composite image on the display.

SUMMARY

However, the conventional printing system described above requires the user to switch among editing screens to compare each tape print image to the composite image. Consequently, the user cannot efficiently edit tape print images on the conventional printing system when two or more tapes are to be superposed.

In view of the foregoing, it is an object of the present disclosure to provide an editing device with which a user can edit print data efficiently when two or more labels are being superposed.

In order to attain the above and other objects, the present disclosure provides an editing device. The editing device is configured to edit print data including first print data and second print data via a display device for creating a composite label with a printing device. The composite label includes a first label and a second label. The composite label is created by superposing the second label over the first label. The first label is printed by the printing device according to the first print data. The second label is printed by the printing device according to the second print data. The editing device includes: a controller; and a memory. The memory stores a set of program instructions therein. The set of program instructions, when executed by the controller, causes the editing device to perform: (a) displaying. The (a) displaying displays an editing screen on the display device. The editing screen has a first region, a second region, and a composite region. The (a) displaying displays a first label image based on the first print data in the first region, a second label image based on the second print data in the second region, and a composite label image formed by superposing the second label image over the first label image in the composite region.

According to another aspect, the present disclosure also provides an editing device configured to edit print data via a display device for creating a composite label with a printing device. The print data includes k number of sets of print data from first print data to k-th print data where k is an integer greater than or equal to two. The composite label includes k number of labels from a first label to a k-th label and being created by superposing the k number of labels sequentially from the first label to the k-th label, an n-th label being printed by the printing device according to n-th print data where n is an integer greater than or equal to one and smaller than or equal to k. The editing device includes: a controller; and a memory. The memory stores a set of program instructions therein. The set of program instructions, when executed by the controller, causes the editing device to perform: (a) displaying. The (a) displaying displays an editing screen on the display device. The editing screen has (k+1) number of regions including k number of individual regions from a first region to a k-th region and a composite region. The (a) displaying displays an n-th label image based on the n-th print data in an n-th region, and a composite label image formed by superposing k number of label images sequentially from a first label image based on the first print data to a k-th label image based on the k-th print data in the composite region.

BRIEF DESCRIPTION OF THE DRAWINGS

The particular features and advantages of the disclosure as well as other objects will become apparent from the following description taken in connection with the accompanying drawings, in which:

FIGS. 17A through 17C are conceptual diagrams illustrating a color information list stored in the flash memory of the editing device according to the embodiment of the present disclosure, in which FIG. 17A illustrates a first color information list created when executing the first color information list creating process illustrated in FIG. 11, FIGS. 17B and 17C respectively illustrate a second color information list and an additional color information list created when executing the overlay color information list creating process illustrated in FIG. 12;

DETAILED DESCRIPTION

Figure 1:
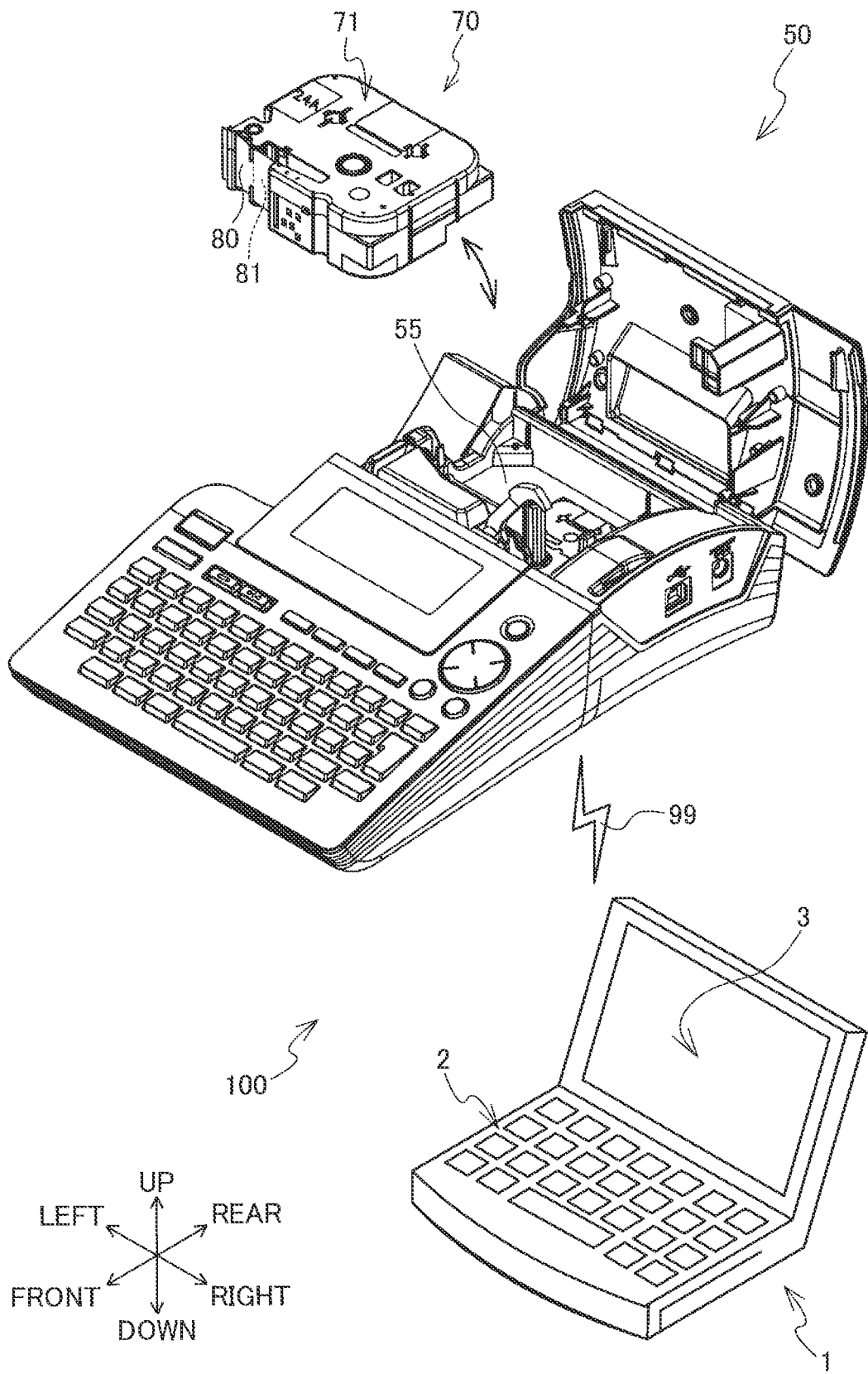
FIG. 1 is a perspective view of a printing system including a printing device and an editing device according to an embodiment of the present disclosure.

An editing device 1 according to one embodiment of the present disclosure will be described while referring to the accompanying drawings. The referenced drawings are used to describe the technical features made possible with the present disclosure. The configurations of the devices described in the drawings are merely examples, and the present disclosure is not intended to be limited to these configurations.

The structure of a printing system 100 will be described with reference to FIGS. 1 through 19. As illustrated in FIG. 1, the printing system 100 is provided with an editing device 1, and a printing device 50. The editing device 1 is a common personal computer. The editing device 1 can communicate with the printing device 50 through a wireless communication link 99. The editing device 1 can edit print data for creating labels. A label is configured of a tape 80, and an image 95 printed on the tape 80. The image 95 may be configured of characters, graphics, symbols, and the like, for example. The print data may include information on the shape of the image 95, color information, and the like. The color information includes information on the color of the image 95 (hereinafter called the "printing color"), information on the color of the tape 80 (hereinafter called the "tape color"), and information on the transmittance of the tape 80. In the present embodiment, transmittance denotes the ratio of radiant exitance for incident light to radiant exitance for transmitted light when visible light is incident on the tape 80.

The printing device 50 is a common thermal printer. The printing device 50 is provided with a cassette mounting section 55, and a thermal head (not illustrated). A tape cassette 70 is mountable in the cassette mounting section 55 of the printing device 50. The tape cassette 70 includes a cassette case 71, a tape 80, and an ink ribbon 81. The cassette case 71 accommodates the tape 80 and ink ribbon 81 therein. The thermal head performs a printing operation based on print data edited on the editing device 1. In a printing operation, an image 95 is printed on the tape 80 using the ink ribbon 81, creating a label. Thus, the printing color in the present embodiment is the color of the ink ribbon 81. The tape cassette 70 has one set of color information based on the colors of the tape 80 and ink ribbon 81. In one print, the printing device 50 can print a label having an image configured of only one set of color information.

Figure 2:
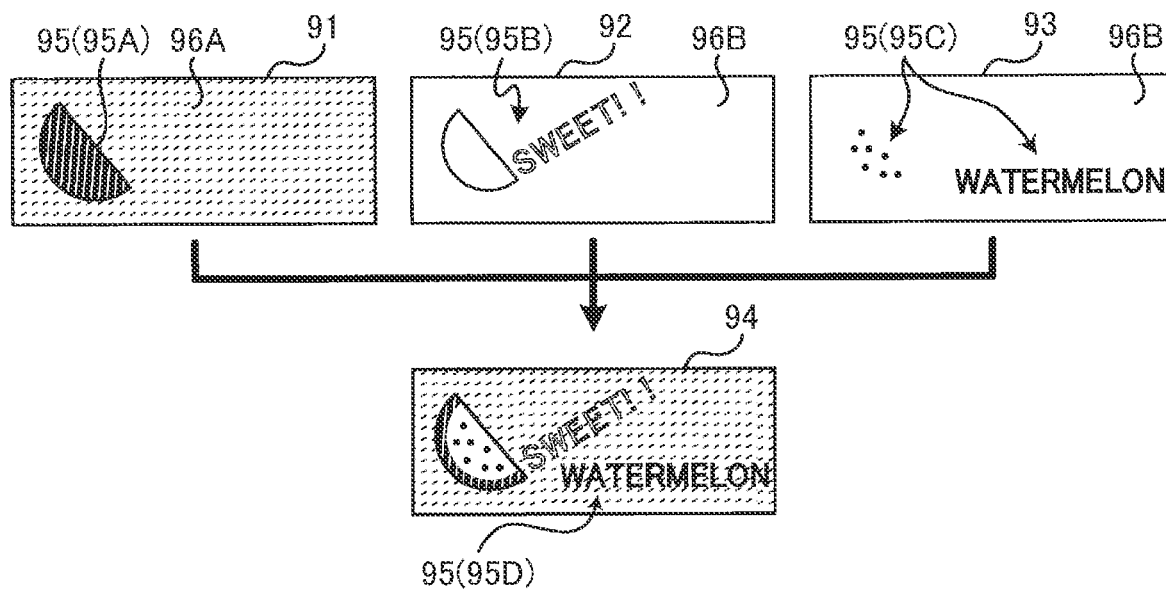
FIG. 2 is an explanatory diagram illustrating a composite label created by superposing a first label, a second label and a third label.

The printing device 50 can be used to create a composite label 94. The composite label 94 is created by superposing a plurality of labels after they are printed. In the example of FIG. 2, the composite label 94 is created by overlaying and bonding together a first label 91, a second label 92, and a third label 93 sequentially from the bottom up. All labels configuring the composite label 94 except the first label 91 will be called "overlay labels." The first label 91 is formed by printing a green image 95A on a translucent white tape 96A. The second label 92 is formed by printing a red image 95B on a transparent tape 96B. The third label 93 is formed by printing a black image 95C on the transparent tape 96B.

When the first label 91, second label 92, and third label 93 are superposed, the corresponding images 95A, 95B, and 95C configure a composite image 95D on the composite label 94. Since the tape 96B of the second label 92 and third label 93 is transparent, the user can see the printed surface of the first label 91 through these overlay labels. In the left side of the composite image 95D formed in the composite label 94, the red image 95B and black image 95C are superposed sequentially over the green image 95A to form an image of a watermelon. Thus, by using the printing device 50 to create individual labels having an image formed in a single printing color through a single print, the printing system 100 can create a composite label 94 that appears to have an image printed in a plurality of colors (referred to as a multicolor label). In order to create the composite label 94, the editing device 1 can be used to edit print data for the label.

Figure 3:
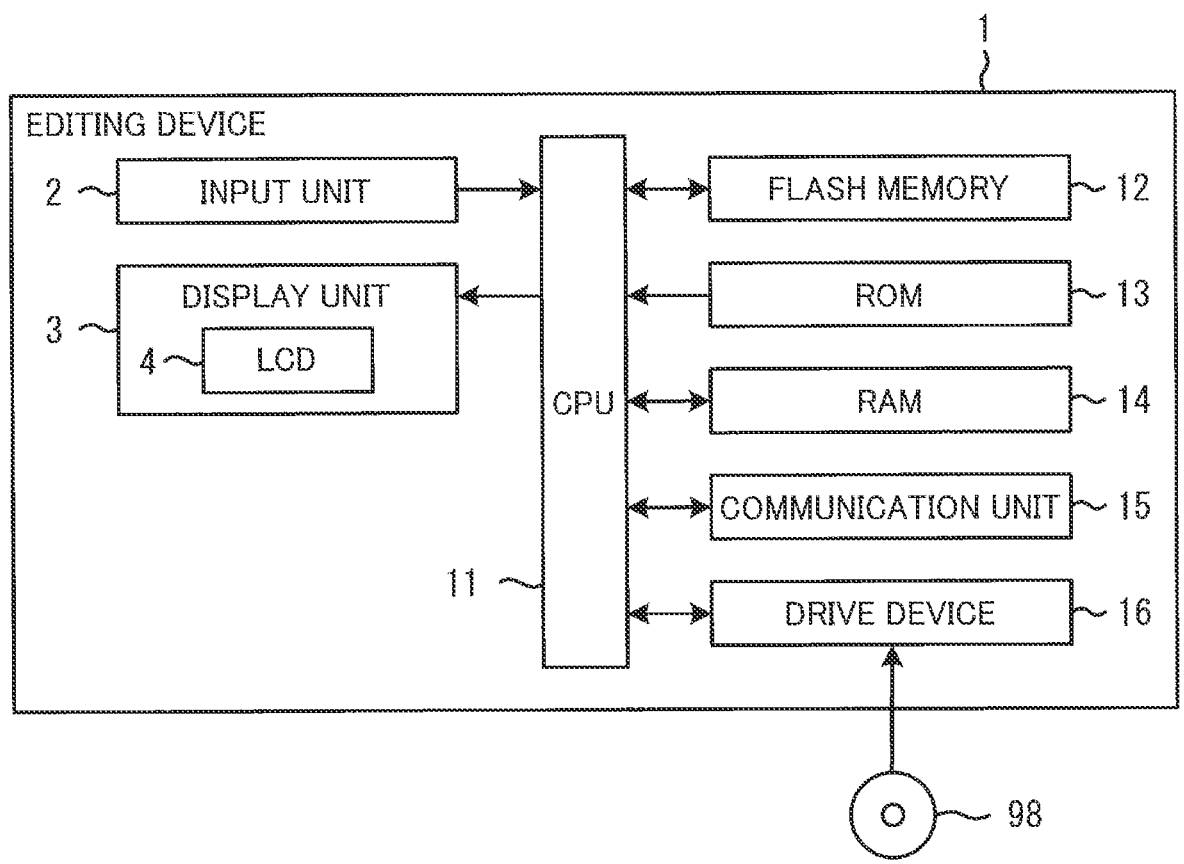
FIG. 3 is a block diagram illustrating an electrical configuration of the editing device according to the embodiment of the present disclosure.

Next, the electrical configuration of the editing device 1 will be described with reference to FIG. 3. The editing device 1 is provided with a central processing unit (CPU) 11. The CPU 11 functions as a processor for controlling the editing device 1. The CPU 11 is electrically connected to a flash memory 12, a read-only memory (ROM) 13, a random-access memory (RAM) 14, a communication unit 15, a drive device 16, an input unit 2, and a display unit 3. The flash memory 12 is a non-transitory storage medium that stores programs executed by the CPU 11, a color information table 97 described later, a color information list 34 described later, and the like. The RAM 14 stores various temporary data. The ROM 13 stores various information that the CPU 11 requires when executing the various programs The communication unit 15 is a controller for communicating with the printing device 50 via the wireless communication link 99. The drive device 16 can read information stored on a storage medium 98. The storage medium 98 may be a semiconductor memory, an optical disk, or the like. The CPU 11 can control the drive device 16 to read a program or the like from the storage medium 98 and store the program or the like in the flash memory 12. The input unit 2 includes a mouse, a keyboard, and the like. The user operates the input unit 2 to input various information into the editing device 1. The display unit 3 is provided with a liquid crystal display (LCD) 4 capable of displaying color images. The display unit 3 displays images and the like based on edited print data, and various other information.

Figure 4:
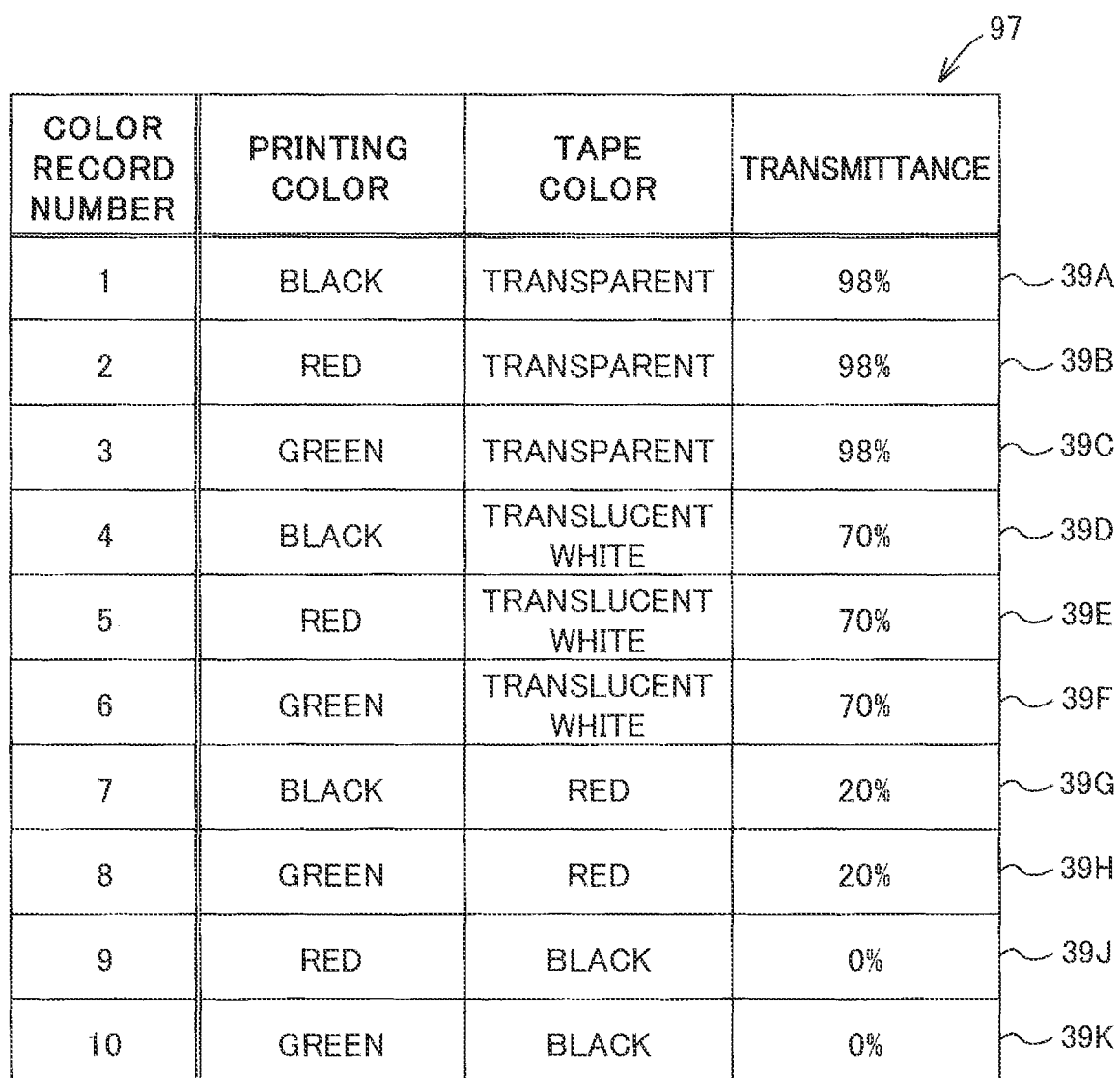
FIG. 4 is a conceptual diagram illustrating a color information table stored in a flash memory of the editing device according to the embodiment of the present disclosure, in which the color information table is provided with a plurality of color records and each color record includes a color record number, a printing color, a tape color, and a transmittance.

The color information table 97 stored on the flash memory 12 will be described next with reference to FIG. 4. The color information table 97 is provided with color records 39A through 39K each of which records a single set of color information. Hereinafter, the color records 39A through 39K will be collectively referred to as "color records 39," and the color information corresponding to each color record 39 will be simply referred to as "color record 39." A color record number is assigned to each color record 39, The color record number identifies the corresponding color record 39. Information on the printing color and tape color included in each color record 39 corresponds to the colors of the ink ribbon 81 and tape 80 provided in the corresponding tape cassette 70. Further, information on the transmittance included in each color record 39 corresponds to the transmittance of the tape 80 provided in the corresponding tape cassette 70. In other words, the color information table 97 is provided with color records 39 respectively corresponding to the tape cassettes 70 that can be used in the printing device 50.

In order to edit print data on the editing device 1, the display unit 3 displays an editing screen 5 on the LCD 4. The editing screen 5 will be described next with reference to FIG. 5. The editing screen 5 has individual regions 21, a region adding button 28, a switching button 29, and a composite region 20. The individual regions 21, region adding button 28, and switching button 29 are arranged in the top section of the editing screen 5, while the composite region 20 is arranged in the bottom section of the editing screen 5.

Figure 5:
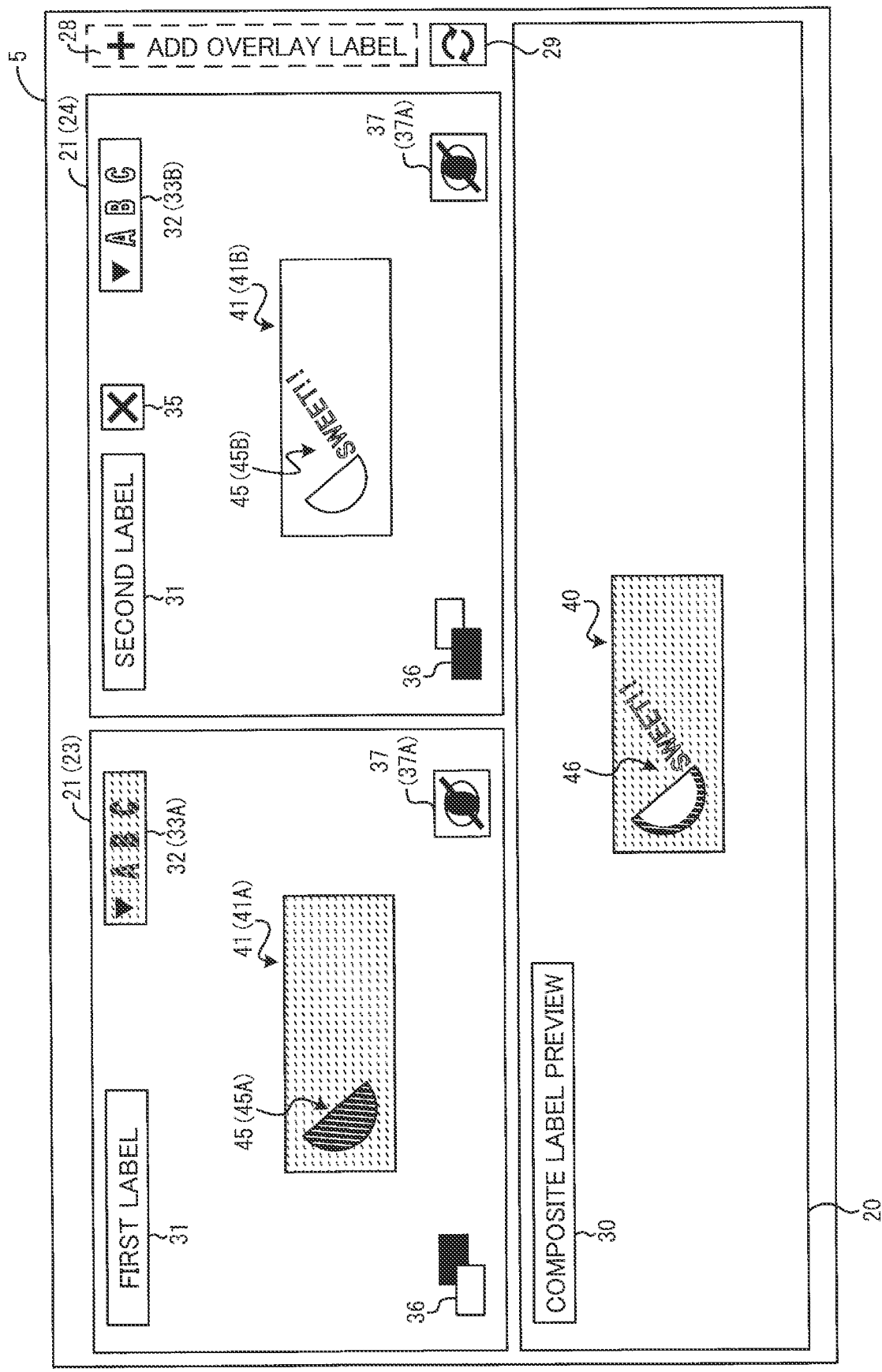
FIG. 5 illustrates a first example of an editing screen displayed by a display unit of the editing device according to the embodiment of the present disclosure, in which the editing screen has two individual regions including a first region for a first label and a second region for a second label, a region adding button, a switching button, and a composite region.

Each individual region 21 is an area in which print data for one label is displayed. Here, the description "print data for one label is displayed" indicates that a label image for the one label to be printed according to the print data and images related to the color information included in the print data are displayed. The number of individual regions 21 is equivalent to the number of labels constituting the composite label 94. The example in FIG. 5 illustrates two individual regions 21 respectively displaying first print data for the first label 91 and second print data for the second label 92. The individual region 21 displaying the first print data will be called a first region 23, and the individual region 21 displaying the second print data will be called a second region 24. That is, a label image 41A for the first label 91 is displayed in the first region 23, and a label image 41B for the second label 92 is displayed in the second region 24. The first region 23 and second region 24 are arranged in order from left to right in the upper section of the editing screen 5. The user edits print data for the corresponding labels on the basis of the displays in the individual regions 21.

The region adding button 28 is provided in the upper-right section of the editing screen 5. The user can operate the region adding button 28 through the input unit 2 to add an individual region 21 for another overlay label to the editing screen 5. The label corresponding to the added individual region 21 becomes the topmost label in the composite label 94. If the individual region 21 were operated in the example of FIG. 5, a third region 25 corresponding to the third label 93 would be added to the editing screen 5 (see FIG. 18).

The switching button 29 is provided below the region adding button 28. By operating the switching button 29 through the input unit 2, the user can switch the positions of print data in two regions. If the switching button 29 were operated in the example of FIG. 5, the first print data would be switched with the second print data. In other words, the second print data prior to switching would be displayed in the first region 23, while the first print data prior to switching would be displayed in the second region 24. In order to switch the print data between two regions, a prescribed condition must be met. This will be described below in greater detail.

A composite label image 40 is displayed in the composite region 20. The composite label image 40 is the result of superposing all label images 41 described later.

Here, the individual region 21 will be described in greater detail. Each individual region 21 is provided with a target color information indicator 32, a label image 41, a caption display area 31, an overlay position indicator 36, and a display toggling button 37. A delete button 35 is further provided in all individual regions 21, excluding the first region 23.

The target color information indicator 32 is provided in the upper-right corner of the individual region 21. The target color information indicator 32 indicates target color information. The target color information is the color information included in the print data corresponding to the individual region 21. The characters "ABC" are arranged in the target color information indicator 32. The color of the characters "ABC" is displayed according to the printing color in the target color information, while the color surrounding the characters represents the tape color in the target color information. If the tape is transparent, the area surrounding the characters "ABC" is displayed in a format representing transparency (a silver color, for example).

The label image 41 is arranged in the center of the individual region 21. The label image 41 is an image based on the print data showing how the label created by the printing device 50 is expected to look. The label image 41 has an object 45. The object 45 is configured of characters, graphics, symbols, or the like. The object 45 shows how the image 95 is expected to look on the label. The object 45 is displayed in the printing color of the target color information. The area of the label image 41 surrounding the object 45 is displayed in the tape color of the target color information. As with the target color information indicator 32, when the tape color in the target color information is transparent, the area of the label image 41 surrounding the object 45 is rendered in a format that represents transparency (a silver color, for example).

The caption display area 31 is provided in the upper-left corner of the individual region 21. The caption display area 31 displays the name of the label (first label, for example) corresponding to the print data displayed in the individual region 21. The overlay position indicator 36 is provided in the lower-left corner of the individual region 21. The overlay position indicator 36 depicts the label of the corresponding individual region 21 in black and labels corresponding to other individual regions 21 in white. The overlay position indicator 36 shows the stacked relationships among superposed labels constituting the composite label 94 according to the overlap between the white and black colors. In the example of FIG. 5, the white label overlaps the black label in the overlay position indicator 36 of the first region. 23, indicating that the first label 91 corresponding to the first region 23 is positioned beneath the second label 92.

Figure 6:
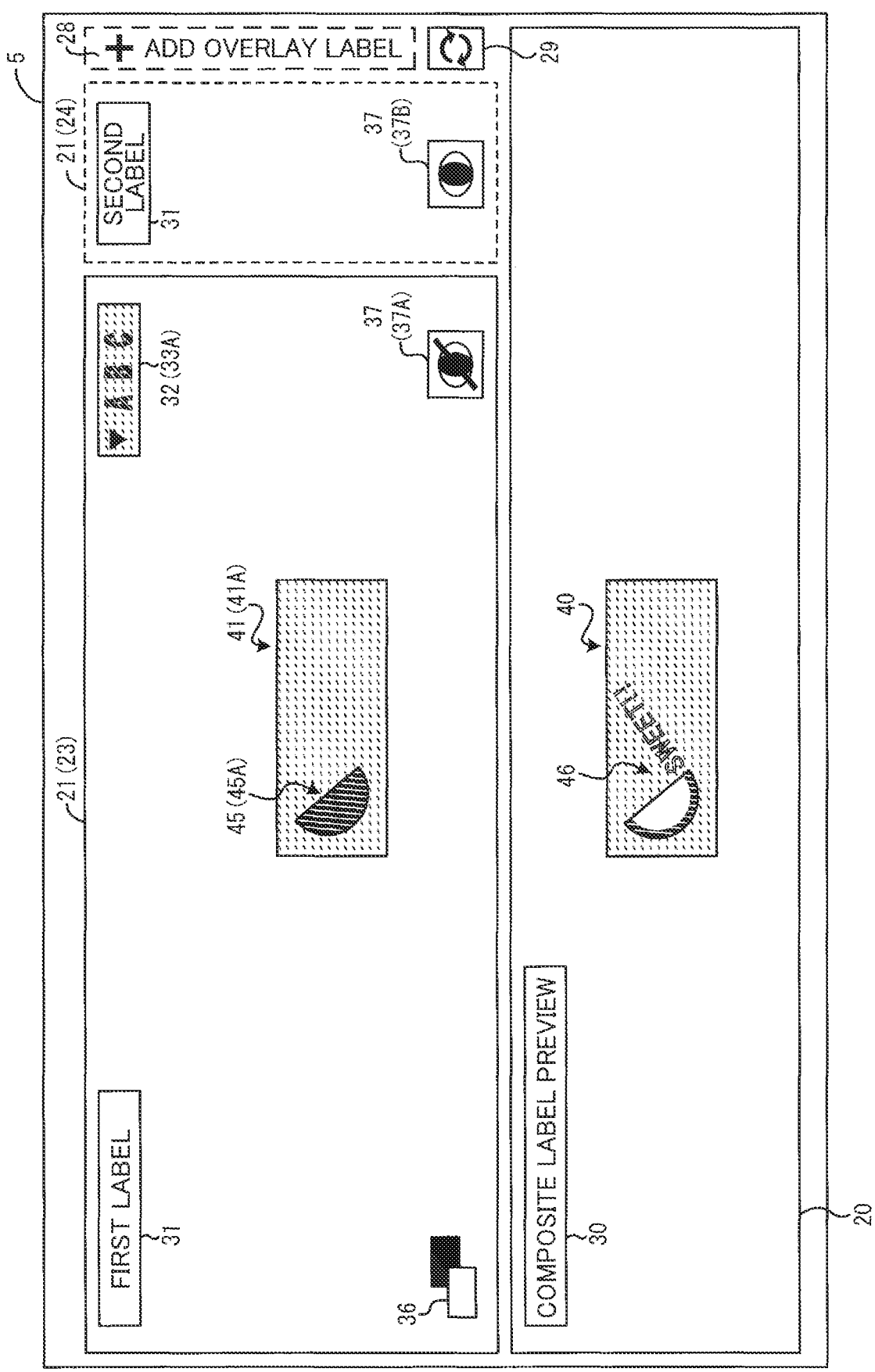
FIG. 6 illustrates a second example of the editing screen displayed by the display unit of the editing device according to the embodiment of the present disclosure, in which a label image of the first label is displayed in the first region while a label image of the second label is not displayed in the second region.

The display toggling button 37 is provided in the lower-right corner of the individual region 21. The display toggling button 37 displays one of a hide display icon 37A and a show display icon 37B (see FIG. 6). When the hide display icon 37A is displayed in the display toggling button 37, the caption display area 31, target color information indicator 32, overlay position indicator 36, display toggling button 37, and label image 41 are displayed in the individual region 21. When the show display icon 37B is displayed in the display toggling button 37, only the caption display area 31 and display toggling button 37 are displayed in the individual region 21, and the label image 41 is not displayed (see FIG. 6). When the user operates the display toggling button 37 using the input unit 2, the individual region 21 in which the display toggling button 37 was operated toggles between a display and non-display. Specifically, when the display toggling button 37 is operated while displaying the hide display icon 37A, the individual region 21 in which the display toggling button 37 was operated changes to display only the caption display area 31 and display toggling button 37, as illustrated in FIG. 6. At this time, the show display icon 37B is displayed in the display toggling button 37 in place of the hide display icon 37A. When the display toggling button 37 is operated while displaying the show display icon 37B, the individual region 21 in which the display toggling button 37 was operated changes to display the caption display area 31, target color information indicator 32, overlay position indicator 36, display toggling button 37, and label image 41, as illustrated in FIG. 5. At this time, the hide display icon 37A is displayed in the display toggling button 37 in place of the show display icon 37B.

The delete button 35 is provided in the left-right center of the top section in individual regions 21 excluding the first region 23. When the user operates the delete button 35 through the input unit 2, the individual region 21 in which the delete button 35 was operated is deleted from the editing screen 5.

Next, the composite region 20 will be described in greater detail. The composite region 20 is provided with the composite label image 40, and a caption display area 30. The composite label image 40 is provided in the center of the composite region 20. In the example of FIG. 5, the composite label image 40 shows the results of superposing a label image 41A based on the first print data with a label image 41B based on the second print data. The composite label image 40 has a composite object 46. The composite object 46 is the image produced by superposing all objects 45. In the example of FIG. 5, the composite object 46 is the result of superposing an object 45A in the label image 41A with an object 45B in the label image 41B. The caption display area 30 is provided in the upper-left corner of the composite region 20. The caption display area 30 displays a caption indicating that the region is the composite region 20 in which the composite label image 40 is previewed.

In the example of FIG. 5, target color information 33A is displayed in the target color information indicator 32 of the first region 23. The target color information 33A illustrates a green printing color and a translucent white tape color. Similarly, target color information 33B is displayed in the target color information indicator 32 of the second region 24. The target color information 33B illustrates a red printing color and a transparent tape color. Accordingly, the composite object 46 in the composite label image 40 is displayed in green and red, while other parts of the composite label image 40 are displayed in translucent white.

Figure 7:
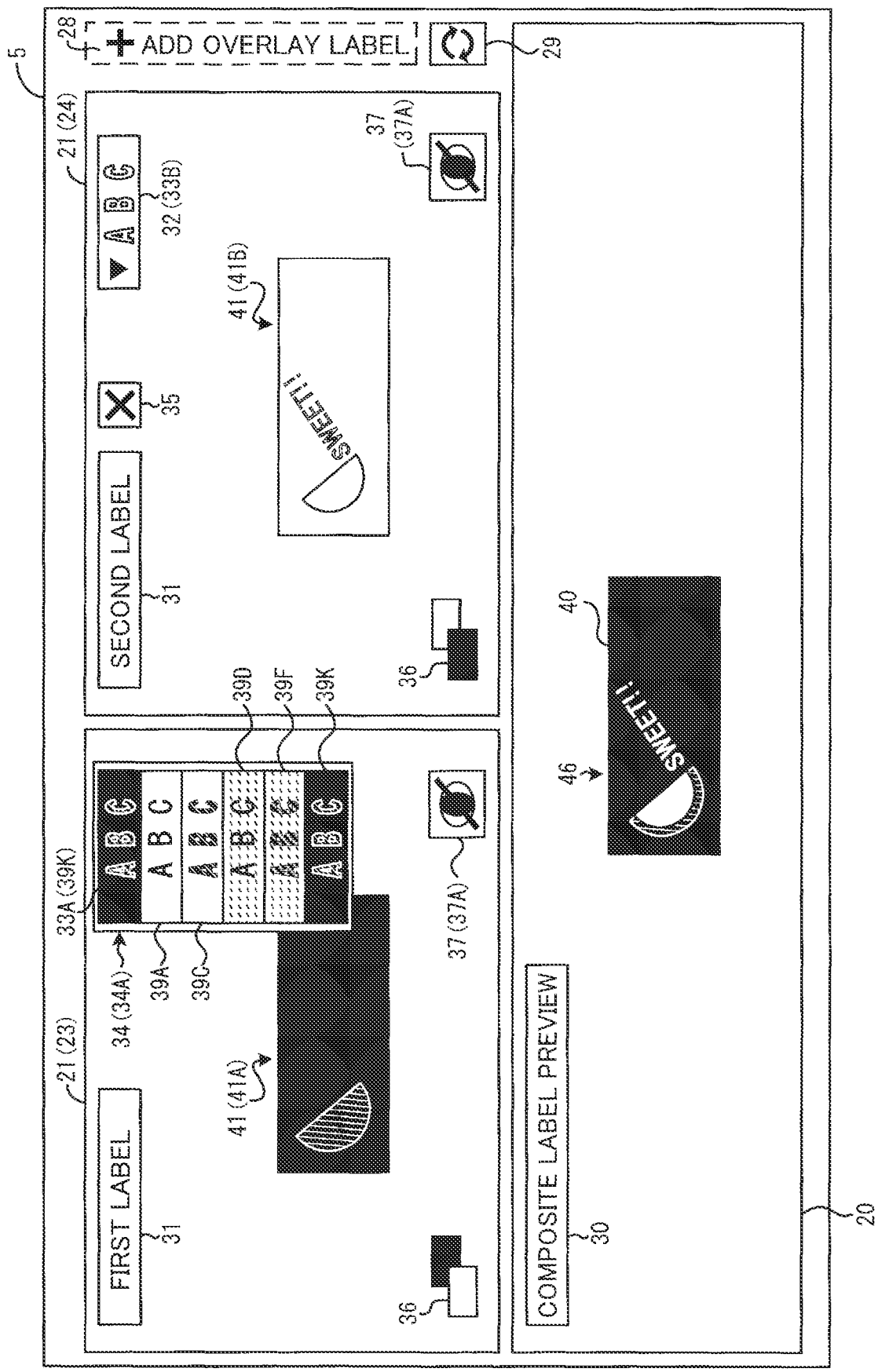
FIG. 7 illustrates a third example of the editing screen displayed by the display unit of the editing device according to the embodiment of the present disclosure, in which a color information list is displayed in the first region for setting target color information.

Next, the process of setting the target color information will be briefly described with reference to FIG. 7. The target color information is set according to the color records 39 in the color information table 97. The user operates the target color information indicator 32 through the input unit 2 in order to select desired target color information. When the user operates the target color information indicator 32, the CPU 11 displays the color information list 34 in the upper-right corner of the individual region 21, as illustrated in FIG. 7.

The color information list 34 displays the target color information and the color records 39. The color records 39 in the color information list 34 allow the user to select only color information from the color information table 97 that is compatible with the print data. The method used to select color records 39 for the color information list 34 will be described later. The user selects one color record 39 from the color information list 34 using the input unit 2. The selected color record 39 is set as the target color information. Once the target color information is set, the colors of the target color information indicator 32, label image 41, and composite label image 40 change according to the selected target color information. In the example of FIG. 7, the color record 39K (green printing color and black tape color) has been selected from the color information list 34 for the first region 23. The color record 39K is then set as the target color information 33A and displayed in the target color information indicator 32. Consequently, the object 45A in the label image 41A is rendered in green, while the area surrounding the object 45A is rendered in black. The target color information 33B illustrates a red printing color and a transparent tape color. Thus, the composite object 46 in the composite label image 40 is displayed in green and red, while areas other than the composite object 46 are rendered in black.

Next, an editing process executed by the CPU 11 will be described with reference to FIGS. 8 through 16. In the editing process, the CPU 11 enables the user to edit print data for creating a composite label 94 and performs display control based on the edited print data. The following description will use the example of the editing screen 5 illustrated in FIGS. 5, 7, and 18 in which print data is edited to create a composite label 94 comprising the first label 91 and second label 92. The user performs an operation on the input unit 2 to initiate the editing process. In response to this user operation, the CPU 11 reads a program for the editing process stored in the flash memory 12.

Figure 8:
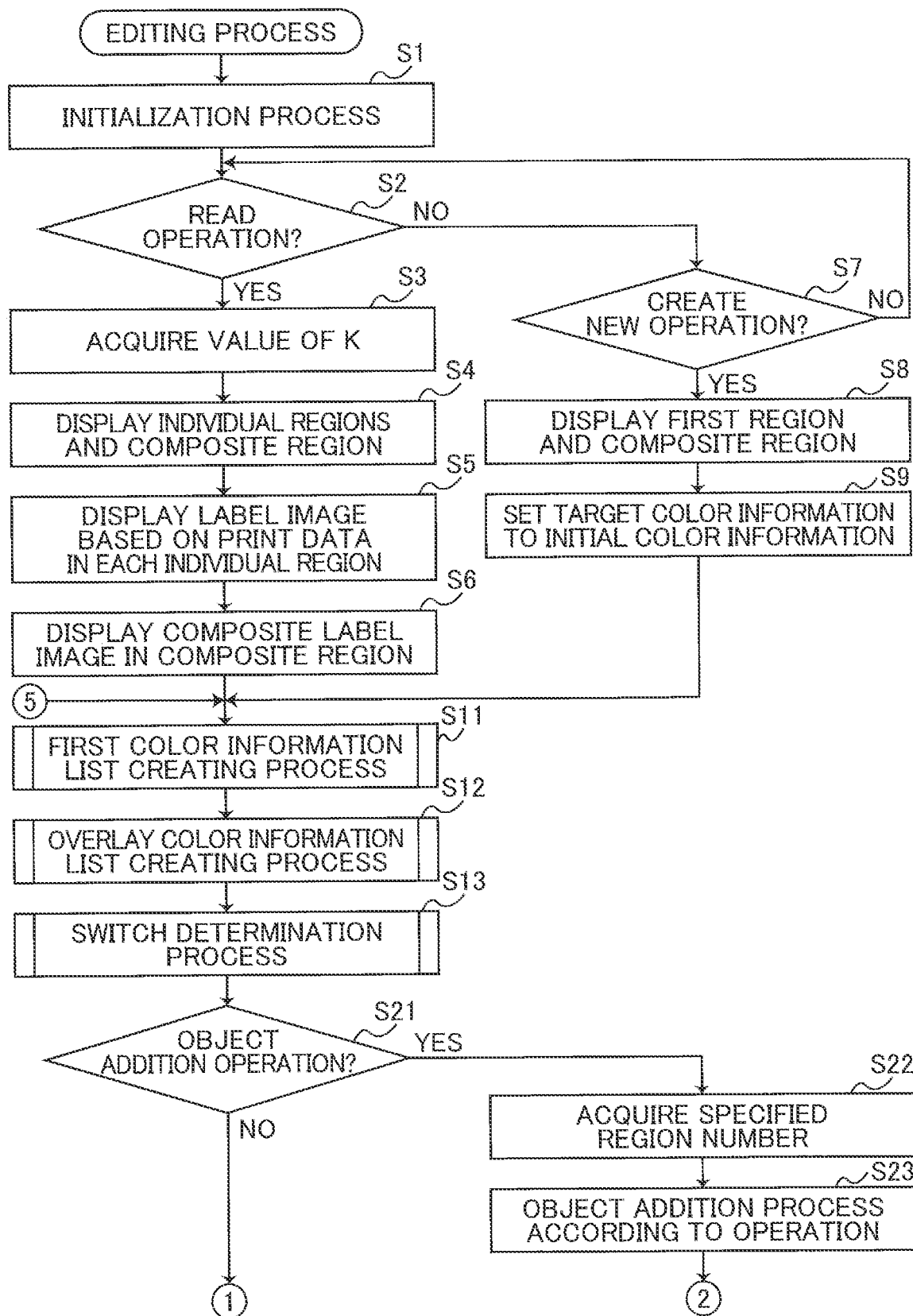
FIG. 8 illustrates a first part of steps in an editing process executed by a CPU of the editing device according to the embodiment of the present disclosure.

In S1 of FIG. 8, the CPU 11 executes an initialization process. In the initialization process, the CPU 11 sets the values of variables K, J, G, F, and E to one and a variable H to two. These variables are stored in the RAM 14. The CPU 11 also sets a plurality of switch prohibiting flags to OFF by storing a "0" (zero) for each flag in the RAM 14. The variable K indicates the total number of individual regions 21. In other words, the variable K indicates the number of labels constituting the composite label 94. The variables J and G both indicate color record numbers that identify records in the color information table 97 (see FIG. 4). The variables H, F, and E and the plurality of switch prohibiting flags will be described later.

In S2 the CPU 11 determines whether an operation to read edited data has been received. The user performs a read operation on the input unit 2 in order to read edited data saved in the flash memory 12. The edited data is configured of print data and information related to the variable K and the like. When a read operation has been received (S2: YES), in S3 the CPU 11 acquires the value of the variable K included in the edited data and stores this value in the RAM 14. In S4 the CPU 11 displays the K number of individual regions 21 (from the first region 23 to the K-th region) and the composite region 20 in the editing screen 5. In S5 the CPU 11 displays the print data in the corresponding individual regions 21 (the first print data through the K-th print data). In S6 the CPU 11 creates a composite label image 40 by superposing all label images 41 in the individual regions 21 and displays this composite label image 40 in the composite region 20. Subsequently, the CPU 11 advances to S11.

On the other hand, if a read operation has not been received (S2: NO), in S7 the CPU 11 determines whether a create new operation to create new edited data has been received. Here, the user operates the input unit 2 to input a create new operation in order to create edited data for a new composite label 94. When a create new operation has been received (S7: YES), in S8 the CPU 11 displays the first region 23 and the composite region 20 in the editing screen 5. In S9 the CPU 11 sets the target color information 33A to predetermined initial color information, and subsequently advances to S11. The initial color information in the present embodiment is the color record 39A in the color information table 97 (see FIG. 4). If the CPU 11 determines in S7 that a create new operation has not been received (S7: NO), the CPU 11 returns to S2.

Thereafter, the CPU 11 executes a process in S11 to create a first color information list (hereinafter called the "first color information list creating process") and executes a process in S12 to create overlay color information lists (hereinafter called the "overlay color information list creating process"). In S11 and S12, color records 39 in the color information table 97 that are compatible with the corresponding label are selected for the color information list 34. One color information list 34 is created for each label. Compatible color records 39 differ for each color information list 34. In S11 the CPU 11 creates a first color information list 34A for the first label 91. In S12 the CPU 11 creates second through K-th color information lists for the corresponding second label 92 through K-th label.

Figure 11:
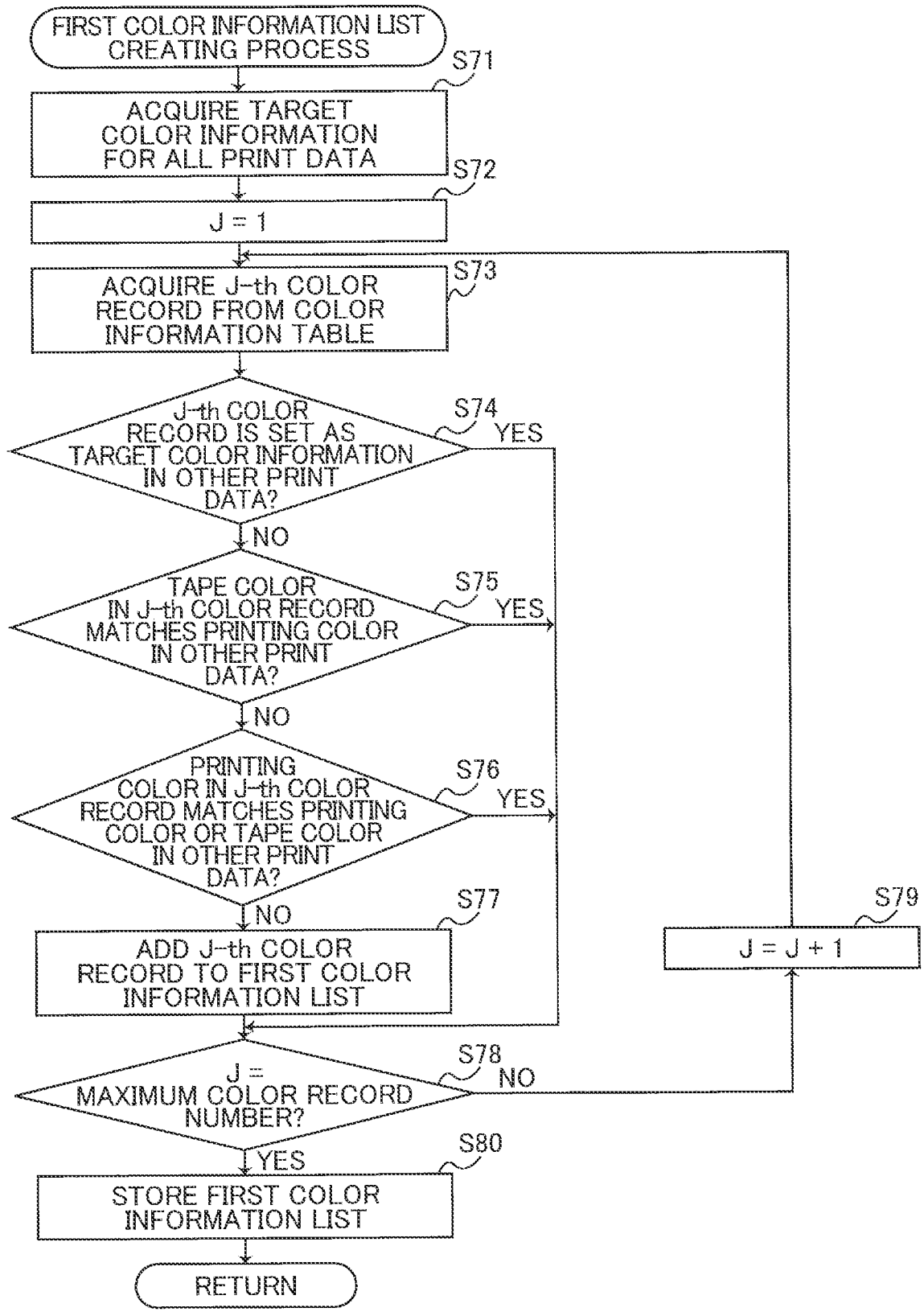
FIG. 11 illustrates steps in a first color information list creating process executed by the CPU of the editing device according to the embodiment of the present disclosure.

FIG. 11 illustrates steps in the first color information list creating process, In S71 at the beginning of the process in FIG. 11, the CPU 11 acquires target color information for all print data (the first print data through the K-th print data). In S72 the CPU 11 sets the value of the variable J to one. In S73 the CPU 11 acquires the color record 39 in the color information table 97 having the color record number J. In other words, in S73 the CPU 11 acquires the J-th color record 39 from the color information table 97.

In steps S74 through S76, the CPU 11 excludes color records 39 that are incompatible with the first label 91 from the first color information list 34A. In S74 the CPU 11 determines whether the J-th color record 39 has already been set as the target color information in other print data. If the J-th color record 39 has been set as the target color information in other print data (S74: YES), the CPU 11 advances to S78 without executing the process in S77 for adding the J-th color record 39 to the first color information list 34A. When creating the first color information list 34A based on the example in FIG. 5, the target color information 33B for the second print data is the color record 39B (see FIG. 4) indicating a red printing color and a transparent tape color. Accordingly, the color record 39B is excluded from the first color information list 34A in S74. If the J-th color record 39 has not been set as target color information in other print data (S74: NO), the CPU 11 advances to S75.

In S75 the CPU 11 determines whether the tape color in the J-th color record 39 matches the printing color in other print data. If the tape color in the J-th color record 39 matches the printing color in target color information of other print data (S75: YES), the CPU 11 advances to S78 without executing the process in S77. When creating the first color information list 34A based on the example in FIG. 5, the tape color of color records 39G and 39H (see FIG. 4) is red, matching the printing color of the second print data (also red). Accordingly, the color records 39G and 39H are excluded from the first color information list 34A in S75. When the tape color in the J-th color record 39 does not match the printing color in target color information of other print data (S75: NO), the CPU 11 advances to S76.

In S76 the CPU 11 determines whether the printing color in the J-th color record 39 matches at least one of the printing color and tape color in other print data. If the printing color of the J-th color record 39 matches at least one of the printing color and tape color in target color information of other print data (S67: YES), the CPU 11 advances to S78 without performing the process in S77. When creating the first color information list 34A based on the example in FIG. 5, the printing color in the color records 39E and 39J (see FIG. 4) is red, matching the printing color of the second print data (also red). Accordingly, the color records 39E and 39J are excluded from the first color information list 34A in S76. When the printing color in the J-th color record 39 does not match any of the printing colors and tape colors in target color information of other print data (S76: NO), the CPU 11 advances to S77.

In S77 the CPU 11 adds the J-th color record 39 to the first color information list 34A. In S78 the CPU 11 determines whether the value of the variable J matches a maximum color record number. The maximum color record number is the maximum value of color record numbers in the color information table 97 (ten in this example). When the value of the variable J does not match the maximum color record number (S78: NO), in S79 the CPU 11 increments the variable J by one and returns to S73.

When the value of the variable J is the maximum color record number (S78: YES), in S80 the CPU 11 stores the first color information list 34A created in this process in the flash memory 12 and returns to the editing process in FIG. 8. When creating the first color information list 34A based on the example in FIG. 5, the color records 39A, 39C, 39D, 39F, and 39K added in S77 (i.e., not excluded from the first color information list 34A in steps S74 through S76) are stored in the first color information list 34A as illustrated in FIG. 17A.

After completing the first color information list creating process in S11 of FIG. 8, in S12 the CPU 11 executes the overlay color information list creating process. In S81 of FIG. 12, the CPU 11 acquires target color information for all print data, as described in S71 of FIG. 11. In S82 the CPU 11 sets the value of the variable H to two and the value of the variable G to one. The value of the variable H indicates the overlay label to which the color information list 34 currently being created corresponds. When H=2, for example, the color information list 34 being created corresponds to the second label 92. In S83 the CPU 11 acquires the color record 39 from the color information table 97 having the color record number G. In other words, in S83 the CPU 11 acquires the G-th color record 39 from the color information table 97.

In S84 through S86, the CPU 11 excludes color records 39 that are not compatible with the H-th label from the H-th color information list. In S84 the CPU 11 determines whether the G-th color record 39 has already been set as the target color information for other print data. If the G-th color record 39 is the target color information for other print data (S84: YES), the CPU 11 advances to S88 without executing the process in S87 to add the G-th color record 39 to the H-th color information list. When creating the second color information list based on the example in FIG. 5, the target color information 33A in the first print data is the color record 39F (see FIG. 4), which indicates a green printing color and a translucent white tape color. Accordingly, the color record 39F is excluded from the second color information list in S84. If the G-th color record 39 has not been set as target color information in other print data (S84: NO), the CPU 11 advances to S85.

In S85 the CPU 11 determines whether the printing color in the G-th color record 39 matches at least one of the printing color and tape color for other print data. If the printing color in the G-th color record 39 matches at least one of the printing color and tape color of other print data (S85: YES), the CPU 11 advances to S88 without executing the process in S87. When creating the second color information list based on the example in FIG. 5, the printing color in the color records 39C, 39H, and 39K (see FIG. 4) is green, which matches the printing color in the first print data (also green). Accordingly, the color records 39C, 39H, and 39K are excluded from the second color information list in S85. If the printing color in the G-th color record 39 does not match either of the printing color and tape color for other print data (S85: NO), the CPU 11 advances to S86.

In S86 the CPU 11 determines whether the overall transmittance when all overlay labels are superposed (hereinafter called the "overlay transmittance") is greater than or equal to a predetermined threshold. When the composite label 94 is configured of the three labels 91 through 93 in FIG. 2, the overlay transmittance is the transmittance of the second label 92 and third label 93 superposed and treated as a single overlay label. In this case, the overlay transmittance is calculated by multiplying the transmittances of the second label 92 and third label 93. The threshold in the present embodiment is 65%. If the overlay transmittance is less than the threshold (S86: NO), the CPU 11 advances to S88 without executing the process in S87. When creating the second color information list based on the example in FIG. 5, the overlay label is only the single second label 92. Accordingly, the overlay transmittance is equivalent to the transmittance provided in the G-th color record 39 in the color information table 97. Thus, the color records 39G and 39J (see FIG. 4) are excluded from the second color information list in S86. If the overlay transmittance is greater than or equal to the threshold (S86: YES), the CPU 11 advances to S87.

In S87 the CPU 11 adds the G-th color record 39 to the H-th color information list. In S88 the CPU 11 determines whether the value of the variable G matches the maximum color record number. When the value of the variable G is not the maximum color record number (S88: NO), in S89 the CPU 11 increments the variable G by one and returns to S83.

When the value of the variable G is the maximum color record number (S88: YES), in S90 the CPU 11 determines whether the value of the variable H matches the value of K+1. When the value of the variable H is not the value K+1 (S90: NO), in S91 the CPU 11 increments the variable H by one, sets the value of the variable G to one, and returns to S83. The CPU 11 repeats the process from S83 to S91 to create color information lists 34 for all overlay labels.

Since the value of the variable K indicates the number of labels constituting the composite label 94, the total number of overlay labels is equivalent to K−1. Thus, the process from S83 through S91 is repeated K−1 number of times (i.e., until H=K) to create a color information list 34 for each overlay label. The color information list 34 created after the variable H is incremented to K+1 in S91 is the (K+1)-th color information list corresponding to the (K+1)-th region added through an operation on the region adding button 28. This color information list 34 will be called an additional color information list 34B.

When creating the additional color information list 34B based on the example in FIG. 5, the additional color information list 34B is the third color information list for the third region 25. The target color information 33A is the color record 39F (see FIG. 4) specifying a green printing color and a translucent white tape color. The target color information 33B is the color record 39B (see FIG. 4) specifying a red printing color and a transparent tape color. Hence, the color record 39B and color record 39F are excluded from the additional color information list 34B in S84, and the color records 39C, 39E, 39H, and 39J are excluded from the additional color information list 34B in S85. The overlay transmittance is found by multiplying the transmittance of the target color information 33B (the color record 39B) by the transmittance of the G-th color record 39. Thus, the color records 39G and 39K are excluded from the additional color information list 34B in S86.

Once the color information lists 34 for all overlay labels and an additional color information list 34B have been created and the value of the variable H matches K+1 (S90: YES), in S92 the CPU 11 stores the color information lists 34 including the additional color information list 34B created above in the flash memory 12 and returns to the editing process of FIG. 8. Specifically, in S92 the second through K-th color information lists 34 and the (K+1)-th color information list 34, i.e., the additional color information list 34B are stored in the flash memory 12. Using the example in FIG. 5, FIG. 17B illustrates the second color information list and FIG. 17C illustrates the additional color information list 34B created when executing the overlay color information list creating process. The second color information list 34 stores the color records 39A, 39B, 39D, and 39E that have been added in S87 (i.e., not excluded from the second color information list 34 in steps in S84 through S86). The additional color information list 34B stores the color records 39A and 39D that have been added in S87 (i.e., not excluded from the additional color information list 34B in steps in S84 through S86).

Figure 13:
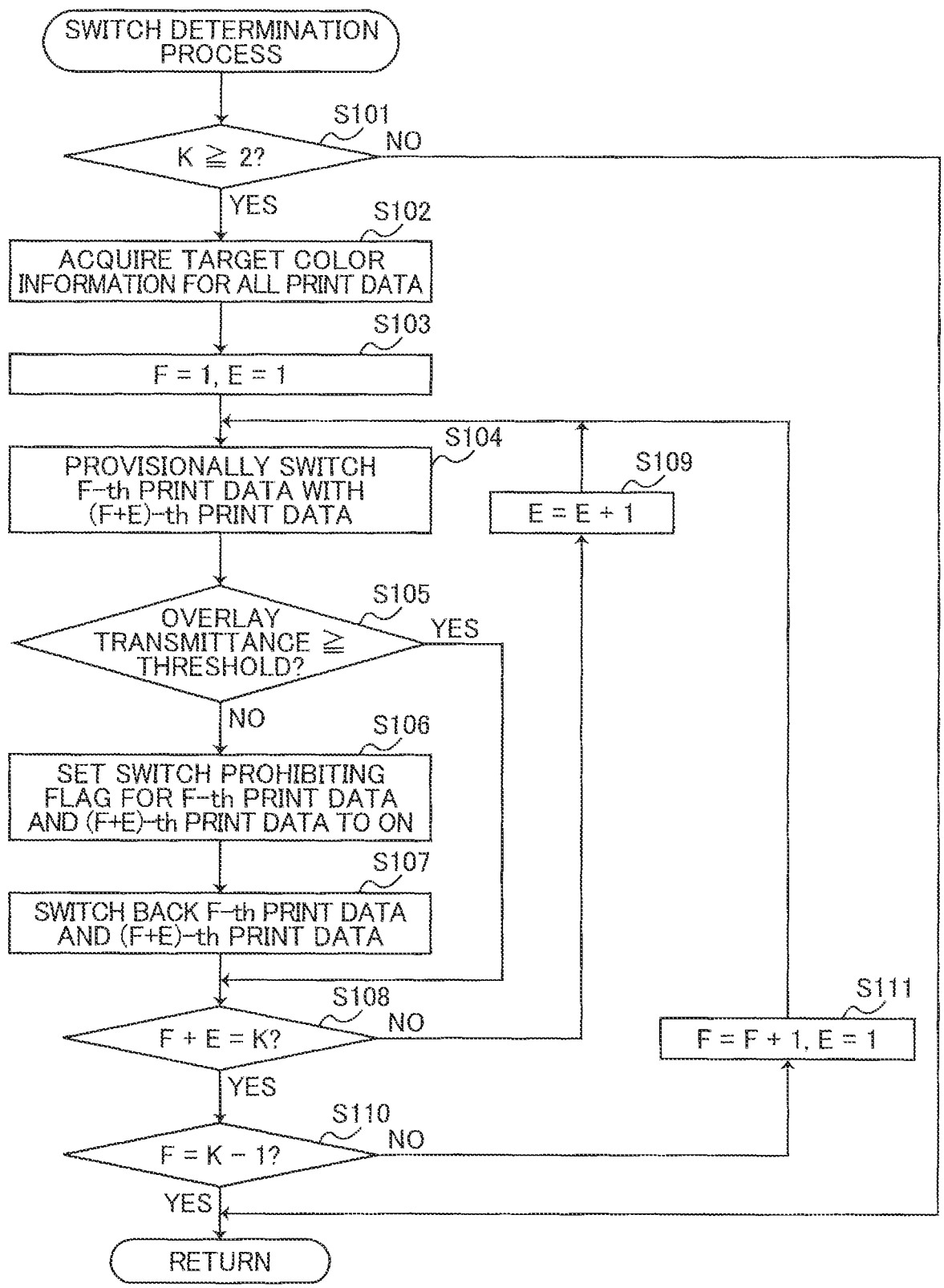
FIG. 13 illustrates steps in a switch determination process executed by the CPU of the editing device according to the embodiment of the present disclosure.

After completing the overlay color information list creating process in S12 of FIG. 8, the CPU 11 executes a switch determination process in S13. The process in S13 is performed to set switch prohibiting flags. A switch prohibiting flag is used for determining whether two sets of print data are switchable (see S38 in FIG. 9), as will be described later. FIG. 13 illustrates steps in the switch determination process. In S101 at the beginning of FIG. 13, the CPU 11 determines whether the value of the variable K is greater than or equal to two. When the value of the variable K is one (S101: NO), the editing screen 5 has only one individual region 21. Since the print data corresponding to the single individual region 21 cannot be switched with other print data, the CPU 11 returns to the editing process in FIG. 8.

When the value of the variable K is greater than or equal to two (S101: YES), in S102 the CPU 11 acquires target color information for all print data. In S103 the CPU 11 sets the values of variables F and E to one. Next, the CPU 11 determines whether the F-th print data and the (F+E)-th print data can be switched. In S104 the CPU 11 provisionally switches the F-th print data with the (F+E)-th print data. That is, the CPU 11 provisionally sets the F-th print data to the current (pre-switched) (F+E)-th print data and sets the (F+E)-th print data to the current (pre-switched) F-th print data. In other words, the F-th label image is provisionally set to the current (pre-switched) (F+E)-th label image based on the current (pre-switched) (F+E)-th print data, and the (F+E)-th label image is provisionally set to the current (pre-switched) F-th label image based on the current F-th print data. Note that any modified content of print data is not displayed at the timing of S104 but is only reflected in the displayed individual regions 21 in step S51 described later (see FIG. 10).

Figure 12:
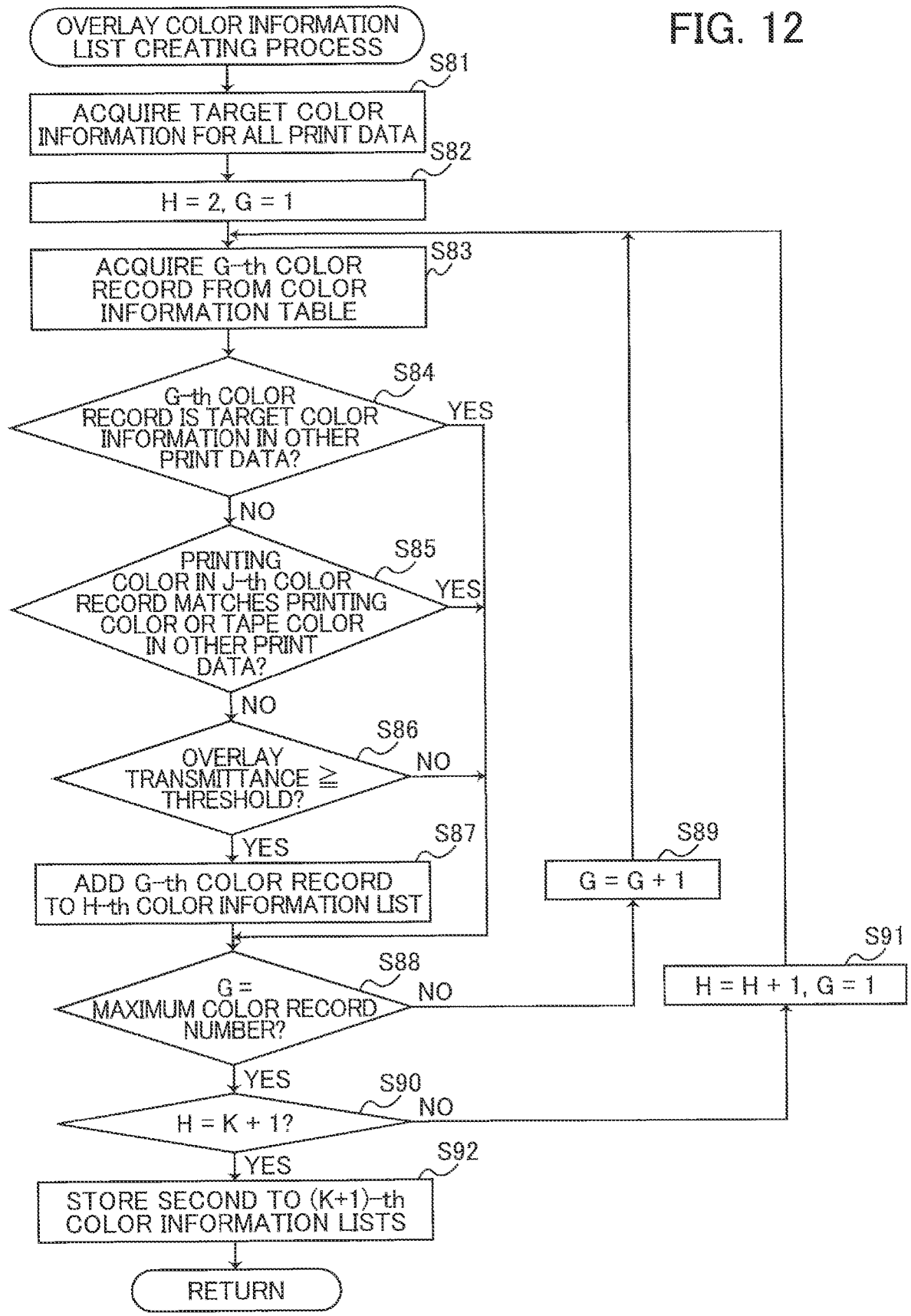
FIG. 12 illustrates steps in an overlay color information list creating process executed by the CPU of the editing device according to the embodiment of the present disclosure.

In S105 the CPU 11 determines according to the same method described in S86 of FIG. 12 whether the overlay transmittance of the overlay labels after print data was provisionally switched is greater than or equal to a threshold. In the present embodiment, the threshold in S105 is 65%, the same as the threshold used in S86. When the overlay transmittance is greater than or equal to the threshold (S105: YES), the CPU 11 advances to S108 without modifying any switch prohibiting flags. When the overlay transmittance is smaller than the threshold (S105: NO), in S106 the CPU 11 sets the switch prohibiting flag corresponding to the combination of the F-th print data and the (F+E)-th print data to ON by storing a "1" (one) for the flag. In S107 the CPU 11 switches back the F-th print data and (F+E)-th print data to restore the content to its state prior to being provisionally switched. Subsequently, the CPU 11 advances to S108.

In S108 the CPU 11 determines whether the value of F+E is equivalent to the value of the variable K. If the value of F+E is not equal to the value of the variable K (S108: NO), in S109 the CPU 11 increments the variable E by one and returns to S104. When the value of F+E is equal to the value of the variable K (S108: YES), in S110 the CPU 11 determines whether the value of the variable F is equivalent to the value of K−1. If the value of the variable F does not match the value of K−1 (S110: NO), in S111 the CPU 11 increments the variable F by one, sets the variable E to one, and returns to S104.

By repeating the process in S104 through S111 described above, the CPU 11 determines in S105 whether two sets of print data are switchable for all possible two-set combinations of print data. Once the value of the variable F equals the value of K−1 (S110: YES), the CPU 11 has completed the switch determination in S105 for all combinations of two sets of print data and returns to the editing process in FIG. 8.

After completing the switch determination process in S13 of FIG. 8, in S21 the CPU 11 determines whether an operation to add an object 45 has been received. To add an object 45 to the label image 41, the user performs an object addition operation on the input unit 2. In this object addition operation, the user specifies a region number and an object 45 to add. The region number is the number identifying the individual region 21 to edit. Each individual region 21 has a unique region number. The n-th region (where n is a natural number) has the region number n. When an object addition operation to add an object 45 has been received (S21: YES), in S22 the CPU 11 acquires the specified region number. In S23 the CPU 11 adds the object 45 specified in the object addition operation to the label image 41 in the individual region 21 corresponding to the region number. Subsequently, the CPU 11 advances to S51 of FIG. 10.

If an object addition operation to add an object 45 has not been received (S21: NO), in S24 of FIG. 9 the CPU 11 determines whether an operation to modify the shape of an object 45 has been received. To modify the shape of an object 45 in an individual region 21, the user performs an object shape modification operation on the input unit 2. In this object shape modification operation, the user specifies a region number and modification content for the object 45. When an object shape modification operation to modify the shape of an object 45 has been received (S24: YES), in S25 the CPU 11 acquires the specified region number. In S26 the CPU 11 modifies the shape of the object 45 in the individual region 21 corresponding to the region number according to the modification content in the operation. Subsequently, the CPU 11 advances to S51 in FIG. 10.

However, if an object shape modification operation to modify the shape of an object 45 has not been received (S24: NO), in S27 the CPU 11 determines whether an operation to delete an object 45 has been received. To delete an object 45 from a label image 41 of an individual region 21, the user performs an object deletion operation on the input unit 2. In this object deletion operation, the user specifies the region number and the object 45 to delete. When an operation to delete an object 45 has been received (S27: YES), in S28 the CPU 11 acquires the specified region number. In S29 the CPU 11 deletes the specified object 45 from the individual region 21 corresponding to the region number, and subsequently advances to S51 of FIG. 10.

However, if an object deletion operation to delete an object 45 has not been received (S27: NO), in S30 the CPU 11 determines whether the target color information indicator 32 has been operated. As described above, the user operates the target color information indicator 32 via the input unit 2 to set target color information. In this operation, the user identifies the region number. When the target color information indicator 32 has been operated (S30: YES), in S31 the CPU 11 executes a process for setting target color information (hereinafter called the "target color information setting process"). After completing the target color information setting process in S31, the CPU 11 advances to S51 of FIG. 10.

Figure 14:
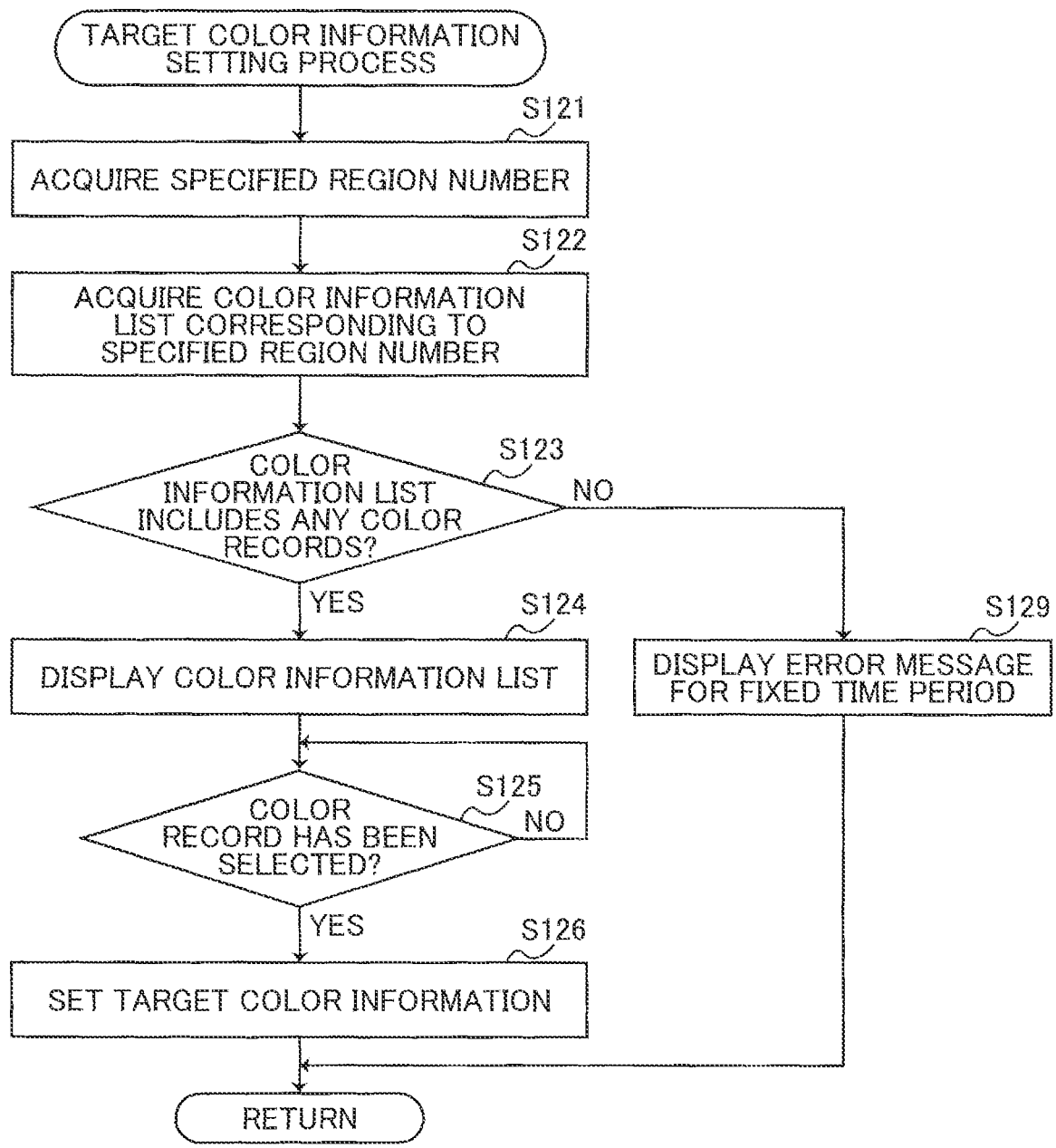
FIG. 14 illustrates steps in a target color information setting process executed by the CPU of the editing device according to the embodiment of the present disclosure.

Next, the target color information setting process in S31 will be described with reference to the flowchart in FIG. 14. In S121 of FIG. 14, the CPU 11 acquires the specified region number. In S122 the CPU 11 acquires the color information list 34 from the flash memory 12 for the individual region 21 corresponding to the region number acquired in S121. In S123 the CPU 11 determines whether the color information list 34 acquired in S122 includes any color records 39.

When no color records 39 in the color information table 97 were added to the color information list 34 in S77 of the first color information list creating process (see FIG. 11) or in S87 of the overlay color information creating process (see FIG. 12), color records 39 do not exist in the color information list 34 (S123: NO). In this case, in S129 the CPU 11 displays an error message in the editing screen 5 for a fixed period of time, and subsequently returns to the editing process in FIG. 9.

If color records 39 do exist in the acquired color information list 34 (S123: YES), in S124 the CPU 11 displays the color information list 34 in the individual region 21. As described above, the color information list 34 is displayed in the upper-right corner of the individual region 21 (see FIG. 7). In 5125 the CPU 11 determines whether a color record 39 has been selected. The user operates the input unit 2 to select a desired color record 39 from the color information list 34 to be applied to the specified individual region 21. While a color record 39 has not been selected (S125: NO), the CPU 11 waits by continually looping back to S25. When a color record 39 has been selected (S125: YES), in S126 the CPU 11 sets the target color information for the designated individual region 21 to the selected color record 39. Subsequently, the CPU 11 returns to the editing process in FIG. 9.

Figure 9:
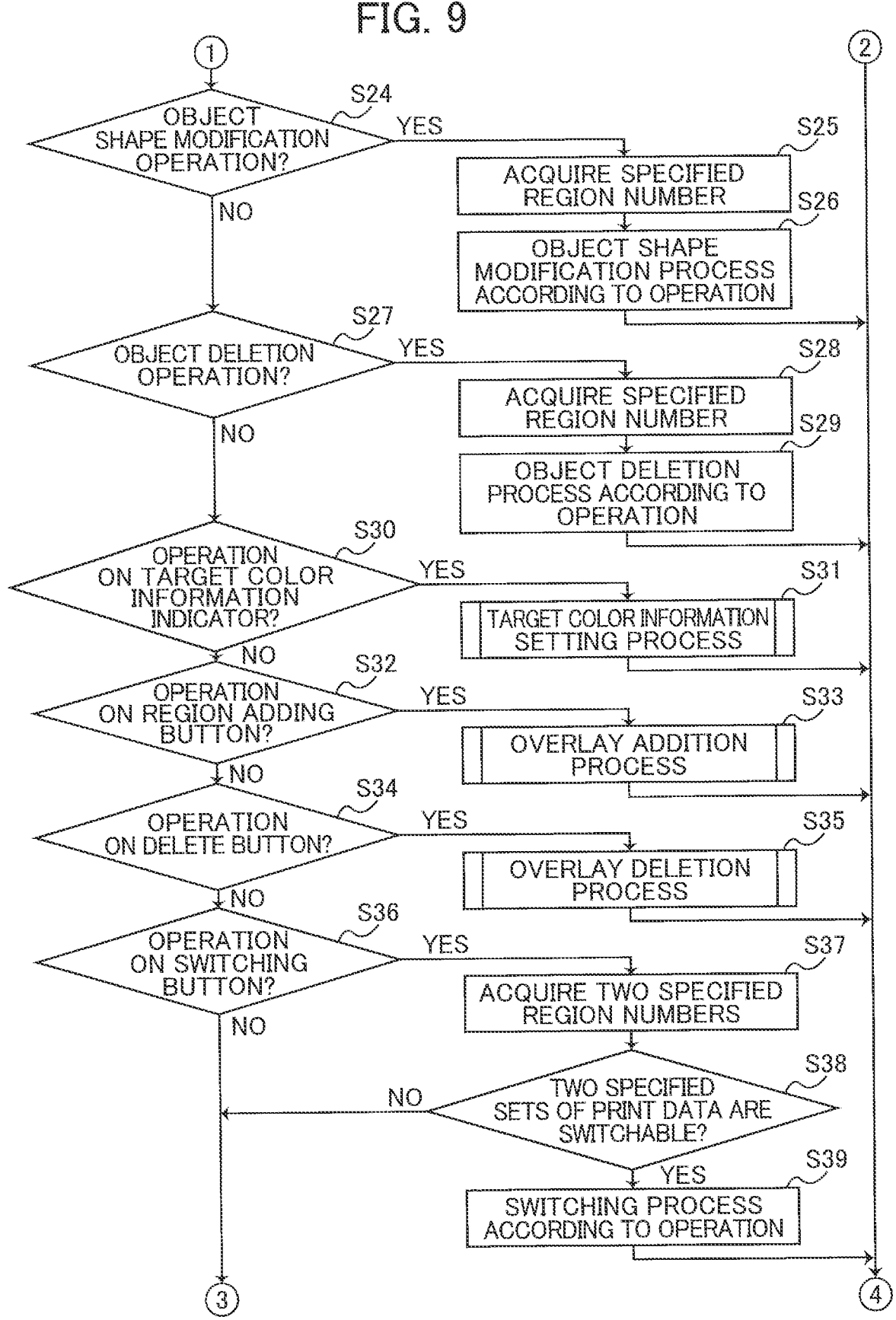
FIG. 9 illustrates a second part of steps in the editing process executed by the CPU of the editing device according to the embodiment of the present disclosure.

On the other hand, if the CPU 11 determines in S30 of FIG. 9 that the target color information indicator 32 has not been operated (S30: NO), in S32 the CPU 11 determines whether the region adding button 28 has been operated. As described above, the user operates the region adding button 28 via the input unit 2 in order to add an overlay label. If the region adding button 28 has been operated (S32: YES), in S33 the CPU 11 executes an overlay addition process. After completing the overlay addition process in S33, the CPU 11 advances to S51 of FIG. 10.

Figure 15:
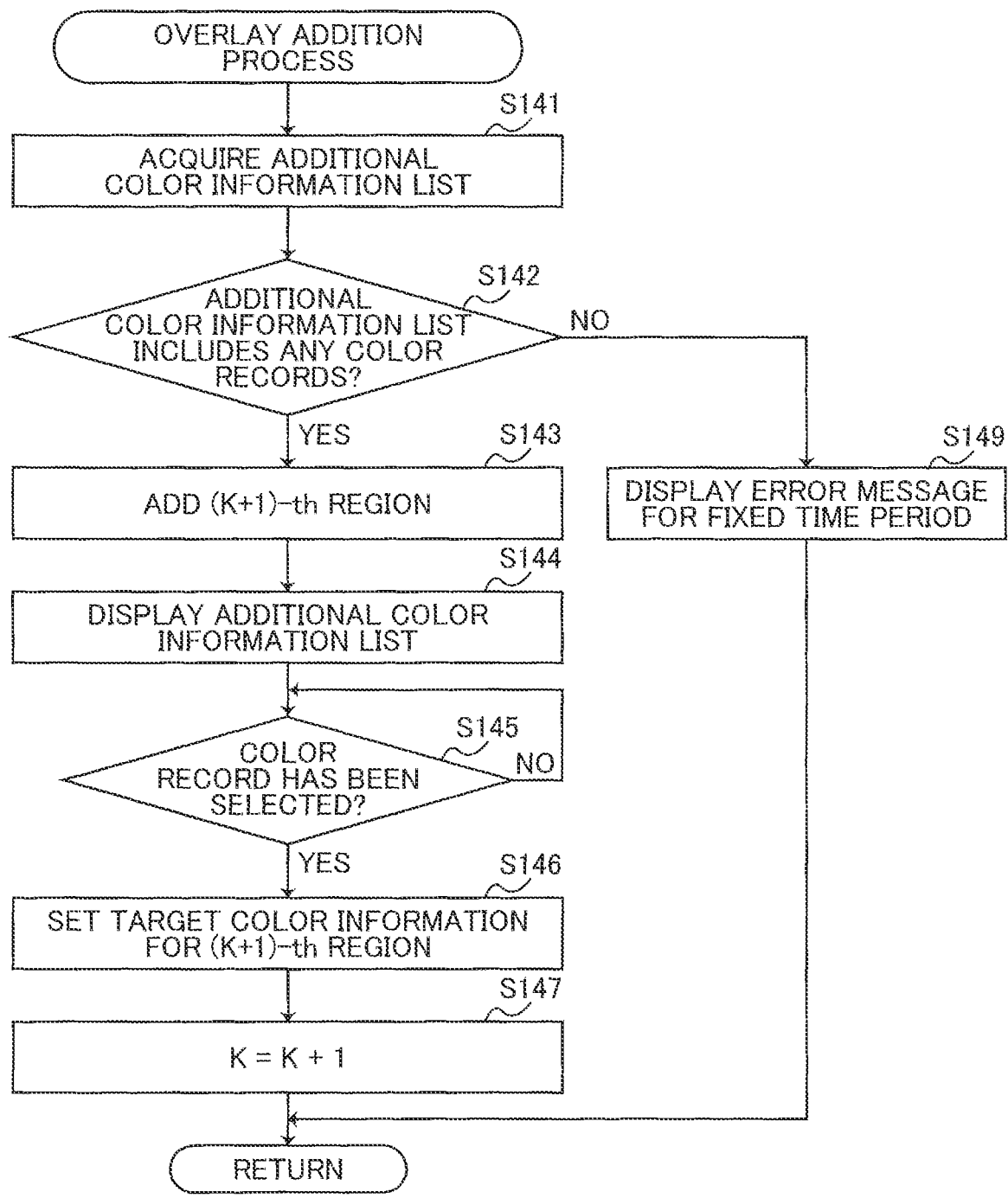
FIG. 15 illustrates steps in an overlay addition process executed by the CPU of the editing device according to the embodiment of the present disclosure.

Next, the overlay addition process of S33 will be described with reference to FIG. 15. In S141 of FIG. 15, the CPU 11 acquires the additional color information list 34B from the flash memory 12. In S142 the CPU 11 determines whether the additional color information list 34B acquired in S141 includes any color records 39. If there are no color records 39 in the additional color information list 34B (S142: NO), in S149 the CPU 11 displays an error message in the editing screen 5 for a fixed period of time. Subsequently, the CPU 11 returns to the editing process in FIG. 9.

Figure 18:
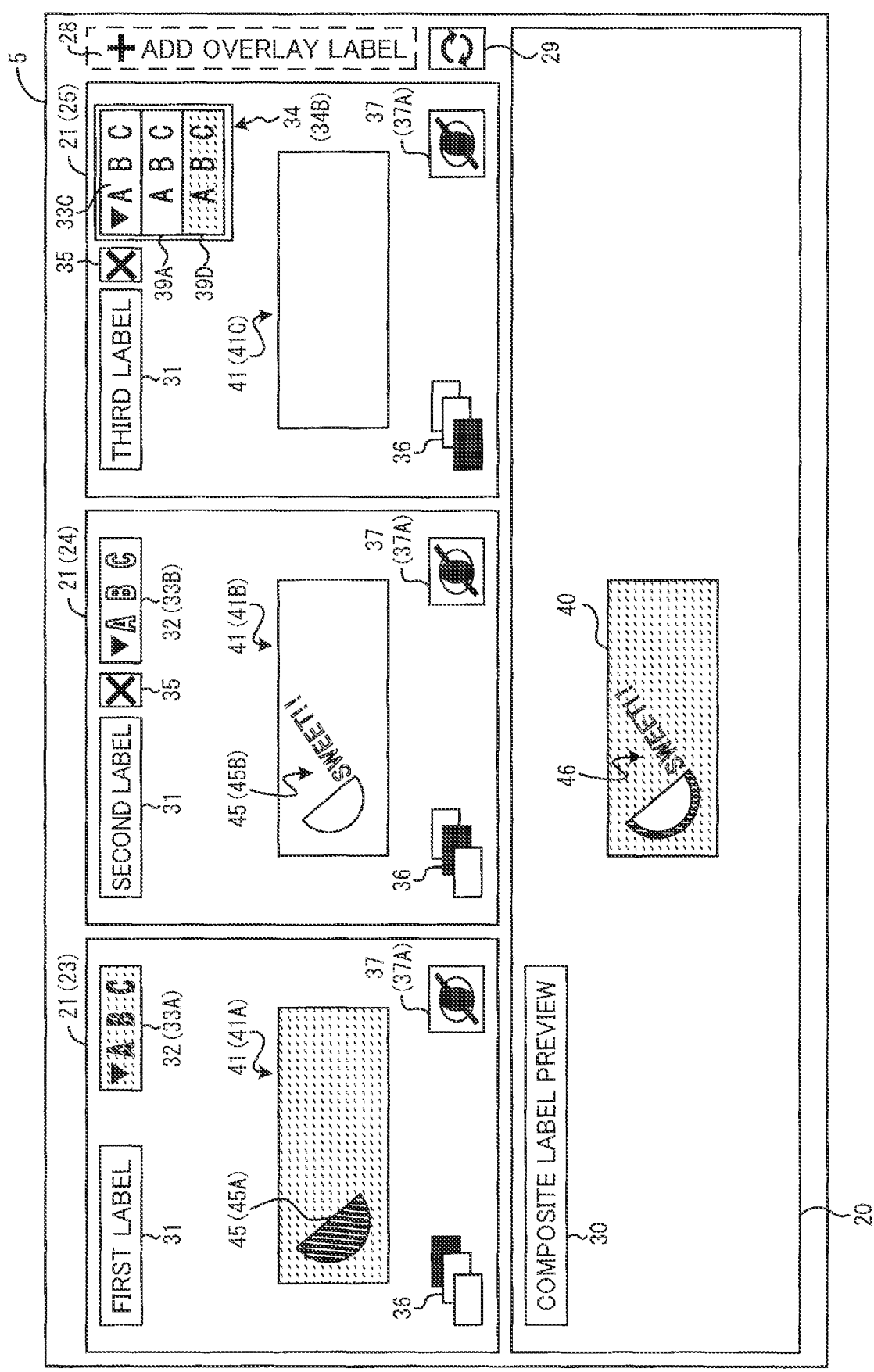
FIG. 18 illustrates a fourth of the editing screen displayed by the display unit of the editing device according to the embodiment of the present disclosure, in which the editing screen has three individual regions including the first region for the first label, the second region for the second label, and a third region for a third label to be added, the region adding button, the switching button, and the composite region.

If color records 39 exist in the additional color information list 34B (S142: YES), in S143 the CPU 11 adds a (K+1)-th region to the editing screen 5. In S144 the CPU 11 displays the additional color information list 34B in the upper-right corner of the (K+1)-th region added in S143. In the example of FIG. 18, the third region 25 corresponding to the third print data for the third label 93 is added to the right side of the second region 24, and the additional color information list 34B including the color records 39A and 39D is displayed in the third region 25.

In S145 the CPU 11 determines whether a color record 39 has been selected. The user operates the input unit 2 to select a desired color record 39 in the color information list 34, i.e., the additional color information list 34B to be applied to the added (K+1)-th region. While a color record 39 has not been selected (S145: NO), the CPU 11 waits by continually looping back to S145. When a color record 39 has been selected (S145: YES), in S146 the CPU 11 sets the target color information for the (K+1)-th region to the selected color record 39. In S147 the CPU 11 increments the variable K by one, and subsequently returns to the editing process in FIG. 9.

On the other hand, if the CPU 11 determines in S32 of FIG. 9 that the region adding button 28 has not been operated (S32: NO), in S34 the CPU 11 determines whether the delete button 35 has been operated. If the user wishes to delete an individual region. 21, the user operates the delete button 35 in the individual region 21 to delete using the input unit 2. This operation designates the region number of the individual region 21 to delete. Since the first region 23 is not provided with a delete button 35, the first region 23 cannot be designated as an individual region 21 to delete. In response to this operation, the input unit 2 outputs an overlay deletion command to the CPU 11. When the delete button 35 has been operated (S34: YES), in S35 the CPU 11 executes an overlay deletion process. After completing the process in S35, the CPU 11 advances to S51 in FIG. 10.

Figure 16:
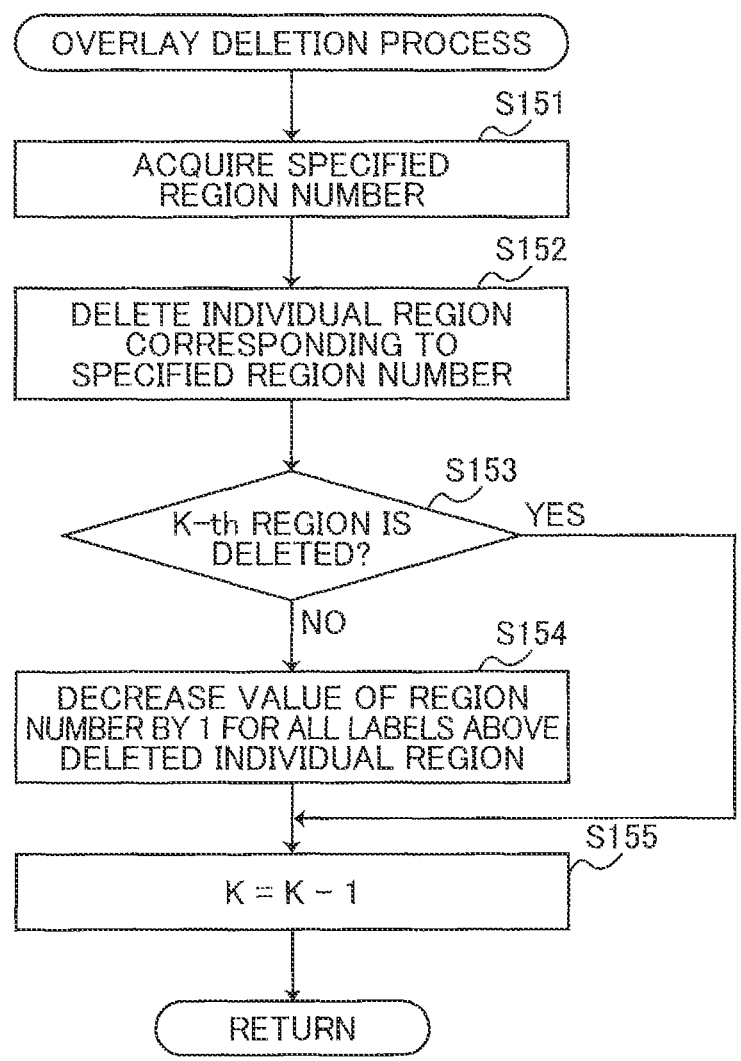
FIG. 16 illustrates steps in an overlay deletion process executed by the CPU of the editing device according to the embodiment of the present disclosure.

Next, the overlay deletion process of S35 will be described with reference to FIG. 16. In S151 of FIG. 16, the CPU 11 acquires the specified region number. In S152 the CPU 11 deletes the individual region 21 corresponding to the specified region number. When deleting the specified individual region 21 in S152, the CPU 11 also deletes the print data corresponding to the deleted individual region 21. In S153 the CPU 11 determines whether the individual region 21 corresponding to the designated region number is the K-th region. In other words, in S153 the CPU 11 determines whether the label corresponding to the deleted individual region 21 is the topmost label in the composite label 94.

If the individual region 21 corresponding to the specified region number is the K-th region (S153: YES), in S155 the CPU 11 decrements the variable K by one, and subsequently returns to the editing process in FIG. 9. However, if the individual region 21 corresponding to the specified region number is not the K-th region (S153: NO), in S154 the CPU 11 decreases the value of the region number by one for all labels above the label corresponding to the specified individual region 21, i.e., the deleted individual region 21. For example, if the region number is n, in S154 the CPU 11 sets the region number to n−1 and sets the corresponding n-th region and n-th print data to the (n−1)-th region and (n−1)-th print data, respectively, for all labels above the label corresponding to the specified, i.e., deleted individual region 21. In S155 the CPU 11 decrements the variable K by one, and subsequently returns to the editing process in FIG. 9.

On the other hand, when the CPU 11 determines in S34 of FIG. 9 that the delete button 35 has not been operated (S34: NO), in S36 the CPU 11 determines whether the switching button 29 has been operated. As described above, the user operates the switching button 29 via the input unit 2 in order to switch the places of two sets of print data. In this operation, the user specifies two region numbers. Specifically, after operating the switching button 29 via the input unit 2, the user selects two individual regions 21, thereby specifying region numbers corresponding to the selected individual regions 21. If the switching button 29 has been operated (S36: YES), in S37 the CPU 11 acquires the two specified region numbers. In S38 the CPU 11 determines whether the two sets of print data corresponding to the specified region numbers are switchable. The CPU 11 makes the determination in S38 based on switch prohibiting flags that have been set in the switch determination process (see FIG. 13).

If the switch prohibiting flag corresponding to the combination of the sets of print data associated with the specified region numbers is ON, i.e., a "1" (one) is stored for the corresponding switch prohibiting flag, the CPU 11 determines that the specified sets of print data are not switchable (S38: NO). In this case, the CPU 11 advances to S40 in FIG. 10 without switching the specified sets of print data. However, if the switch prohibiting flag corresponding to the combination of print data is OFF, i.e., a "0" (zero) is stored for the corresponding switch prohibiting flag, the CPU 11 determines that the specified sets of print data are switchable (S38: YES). In this case, in S39 the CPU 11 switches places of the two sets of print data, and subsequently advances to S51 of FIG. 10.

Figure 10:
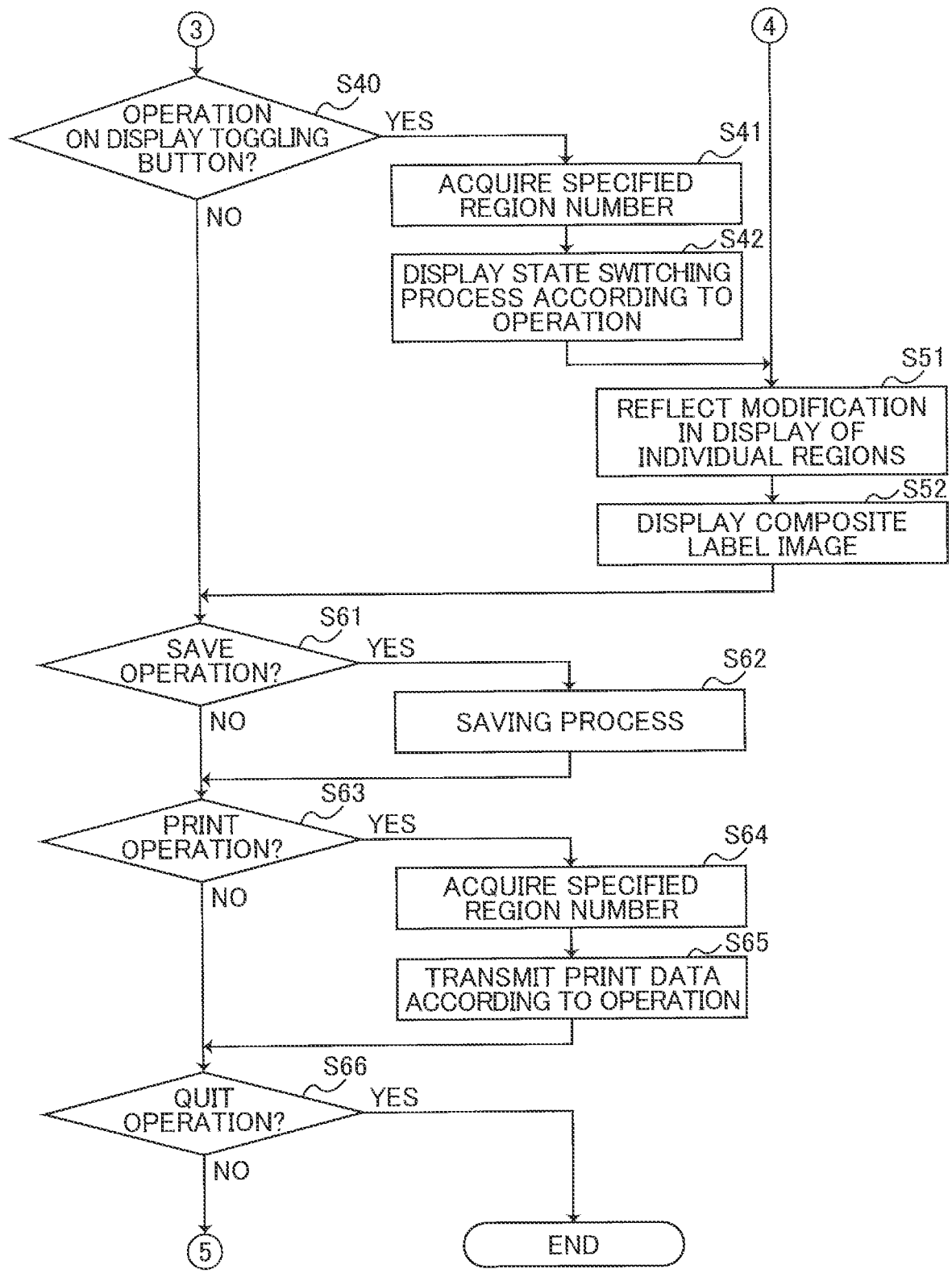
FIG. 10 illustrates a third part of steps in the editing process executed by the CPU of the editing device according to the embodiment of the present disclosure.

On the other hand, if the switching button 29 has not been operated (S36 NO), in S40 of FIG. 10 the CPU 11 determines whether the display toggling button 37 has been operated. The user uses the input unit 2 to operate the display toggling button 37 in an individual region 21 to be toggled between a displayed state and a non-displayed state. Through this operation, the user specifies the region number of the individual region 21 to be toggled and indicates whether the individual region 21 is to be set to a displayed state or a non-displayed state. When the CPU 11 receives a display toggle command (S40: YES), in S41 the CPU 11 acquires the specified region number. In S42 the CPU 11 switches the state of the individual region 21 corresponding to the specified region number to a displayed state or a non-displayed state. Subsequently, the CPU 11 advances to S51.

After completing all processes based on operations performed via the input unit 2 (S23, S26, S29, S31, S33, S35, S39, and S42), in S51 the CPU 11 reflects the print data modified through these processes in the individual regions 21 displayed in the editing screen 5. In S52 the CPU 11 creates a composite label image 40 by superimposing the label images 41 and displays the composite label image 40 in the composite region 20. Subsequently, the CPU 11 advances to S61. As an example, if the color record 39K was selected in the target color information 33A as illustrated in FIG. 7, the CPU 11 changes the color of the label image 41A according to the target color information 33A and displays the modified label image 41A. As a result of modifying the color of the label image 41A, the CPU 11 also modifies the color of the composite label image 40 displayed in the composite region 20.

If the CPU 11 determines in S40 that the display toggling button 37 has not been operated (S40: NO) or after the CPU 11 has displayed the composite label image 40 on the composite region 20 in S52, in S61 the CPU 11 determines whether a save operation was received. The user performs a save operation via the input unit 2 in order to save edited data in the flash memory 12. If a save operation has been received (S61: YES), in S62 the CPU 11 saves the edited data in the flash memory 12. Subsequently, the CPU 11 advances to S63. On the other hand, if a save operation has not been received (S61: NO), the CPU 11 advances to S63 without saving the edited data.

In S63 the CPU 11 determines whether a print operation has been received. The user performs a print operation via the input unit 2 in order to print a label based on the edited print data. In this operation, the user specifies a region number. If a print operation has been received (S63: YES), in S64 the CPU 11 acquires the specified region number. In S65 the CPU 11 transmits print data corresponding to the region number to the printing device 50 via the communication unit 15. Subsequently, the CPU 11 advances to S66. However, if a print operation has not been received (S63: NO), the CPU 11 advances to S66 without transmitting print data to the printing device 50.

In S66 the CPU 11 determines whether a quit operation has been received. The user performs a quit operation via the input unit 2 in order to quit the editing process. If a quit operation has not been received (S66: NO), the CPU 11 returns to S11 in FIG. 8 and continues to receive operations through the input unit 2 for editing print data. However, if a quit operation has been received (S66: YES), the CPU 11 ends the editing process.

As described above, the composite label 94 includes the first label 91 printed by the printing device 50 according to the first print data, and the second label 92 printed by the printing device 50 according to the second print data and superposed over the first label 91. In order to create the composite label 94, the editing device 1 can be used to edit the first print data and second print data in the editing screen 5 displayed on the display unit 3. The editing device 1 is provided with the CPU 11, and the flash memory 12. The flash memory 12 stores a program for the editing process executed by the CPU 11. The display unit 3 is provided with the LCD 4. The display unit 3 is configured to display the editing screen 5 including the first region 23, second region 24, and composite region 20 on the LCD 4. In S51 and S52 of the editing process, the CPU 11 displays the label image 41A in the first region 23 based on the first print data, displays the label image 41B in the second region 24 based on the second print data, and displays the composite label image 40 in the composite region 20 (see FIG. 5). With this display, the user can confirm at a glance the label images 41 for all of the edited sets of print data, and the resulting composite label image 40. Hence, the user can efficiently edit print data used for superposing a plurality of labels.

A plurality of types of tape cassettes 70 respectively provided with a plurality of types of tapes 80 can be selectively mounted in the printing device 50. The flash memory 12 stores the color information table 97. Color records 39 each of which includes information on the printing color that is printed on the tape 80 is provided in the color information table 97. In the target color information setting process (S31), the CPU 11 sets target color information for each of the first print data and second print data based on color records 39 in the color information table 97. In this way, the user can select a printing color from among actual printable colors, enabling the user to edit print data efficiently.

The plurality of tape cassettes 70 is respectively provided with a plurality of types of ink ribbons 81. The printing color is the color of the corresponding ink ribbon 81. Thus, the user can set target color information based on the colors of the ink ribbons 81.

The color records 39 respectively include information on colors of tapes 80. Since each color record 39 includes information on the combination of the colors of the tape 80 and the ink ribbon 81 provided in the corresponding tape cassette 70, the user can set target color information based on a plurality of pairs of colors of the tape 80 and ink ribbon 81 provided in tape cassettes 70 that are actually available.

The CPU 11 executes the first color information list creating process (S11) in order to create the first color information list 34A in which the user can select color records 39 compatible with the first label 91. The CPU 11 executes the process to create overlay color information lists (S12) in order to create a color information list 34 in which the user can select color records 39 compatible with the second label 92. The CPU 11 displays the created color information list 34 in the target color information setting process (S124). The CPU 11 sets the color record 39 selected from the color information list 34 corresponding to either the first label 91 or the second label 92 as the target color information for that label (S126). Accordingly, the user can easily set target color information based on the color information list 34.

The color records 39 respectively include information on the transmittances of the tapes 80. In the overlay color information list creating process, the CPU 11 selects color records 39 for the second color information list so that the transmittance of the second label 92 is greater than or equal to a predetermined threshold. Since color records 39 are selected for the second color information list, the number of selections of color records 39 in the color information list 34 can easily be reduced. Therefore, the user can efficiently edit print data for a plurality of labels to be superposed.

In the first color information list creating process and the overlay color information list creating process, the CPU 11 excludes color records 39 that have been set as other target color information from the color information list 34 for either the first label 91 or second label 92 (S74, S84: YES). Since the number of selections of color records 39 can easily be reduced in the color information list 34, the user can efficiently edit print data for labels that will be superposed.

In the first color information list creating process and the overlay color information list creating process, the CPU 11 excludes color records 39 that include a printing color identical to the printing color or tape color in other target color information from the color information list 34 for either the first label 91 or second label 92 (S76, S85: YES). Thus, since the number of selections of color records 39 can easily be reduced in the color information list 34, the user can efficiently edit print data for labels that will be superposed.

In the first color information list creating process, the CPU 11 excludes color records 39 that include a tape color identical to the printing color in the target color information for the second label 92 (S75: YES). Thus, since the number of selections of color records 39 can easily be reduced in the color information list 34, the user can efficiently edit print data for a plurality of labels that will be superposed.

In the overlay color information list creating process, the CPU 11 creates the additional color information list 34B. The CPU 11 can execute the overlay addition process (S33) to add third print data for the third label 93. In the overlay addition process, the CPU 11 sets the color record 39 selected from the additional color information list 34B as the target color information for the third print data (S146). Thus, when adding print data, the user can easily set target color information for the third print data.

In the switch determination process (S13), the CPU 11 determines whether the first print data and second print data can be switched. In the switch determination process, the CPU 11 determines whether the transmittance of the second label 92 (overlay transmittance) based on the second print data after the second print data and first print data have been switched is greater than or equal to a predetermined threshold (S105). When the overlay transmittance is smaller than the threshold (S105: NO), the CPU 11 sets the switch prohibiting flag for the first print data and second print data to ON by storing a "1" (one) for the flag (S106). The CPU 11 determines whether a switch command outputted by the input unit 2 in response to receiving a user operation (S36). When the CPU 11 receives a switch command (S36: YES) and the switch prohibiting flag is OFF, the CPU 11 switches the first print data and print data. The CPU 11 can perform the switching process when determining that print data is switchable according to the determination results in the switch determination process. Accordingly, the user can efficiently edit print data for a plurality of labels to be superposed.

In the present embodiment, the CPU 11 is an example of the controller of the present disclosure. The flash memory 12 is an example of the memory of the present disclosure. The label image 41A is an example of the first label image of the present disclosure, the label image 41B is an example of the second label image of the present disclosure, and the composite label image 40 is an example of the composite label image of the present disclosure.

The process of S51 and S52 executed by the CPU 11 is an example of the (a) displaying of the present disclosure. The process of S31 executed by the CPU 11 is an example of the (b1) setting of the present disclosure. The process of S124 executed by the CPU 11 is an example of the (b3) displaying of the present disclosure. The threshold used in the process of S86 is an example of the first threshold of the present disclosure. The value of the switch prohibiting flag is an example of the determining in (b5) that the first print data and the second print data are switchable of the present disclosure. The process of S39 executed by the CPU 11 is an example of the (b6) switching of the present disclosure. The threshold used in the process of S105 is an example of the second threshold of the present disclosure. The process of S105 executed by the CPU 11 is an example of the (b51) determining of the present disclosure.

Figure 19:
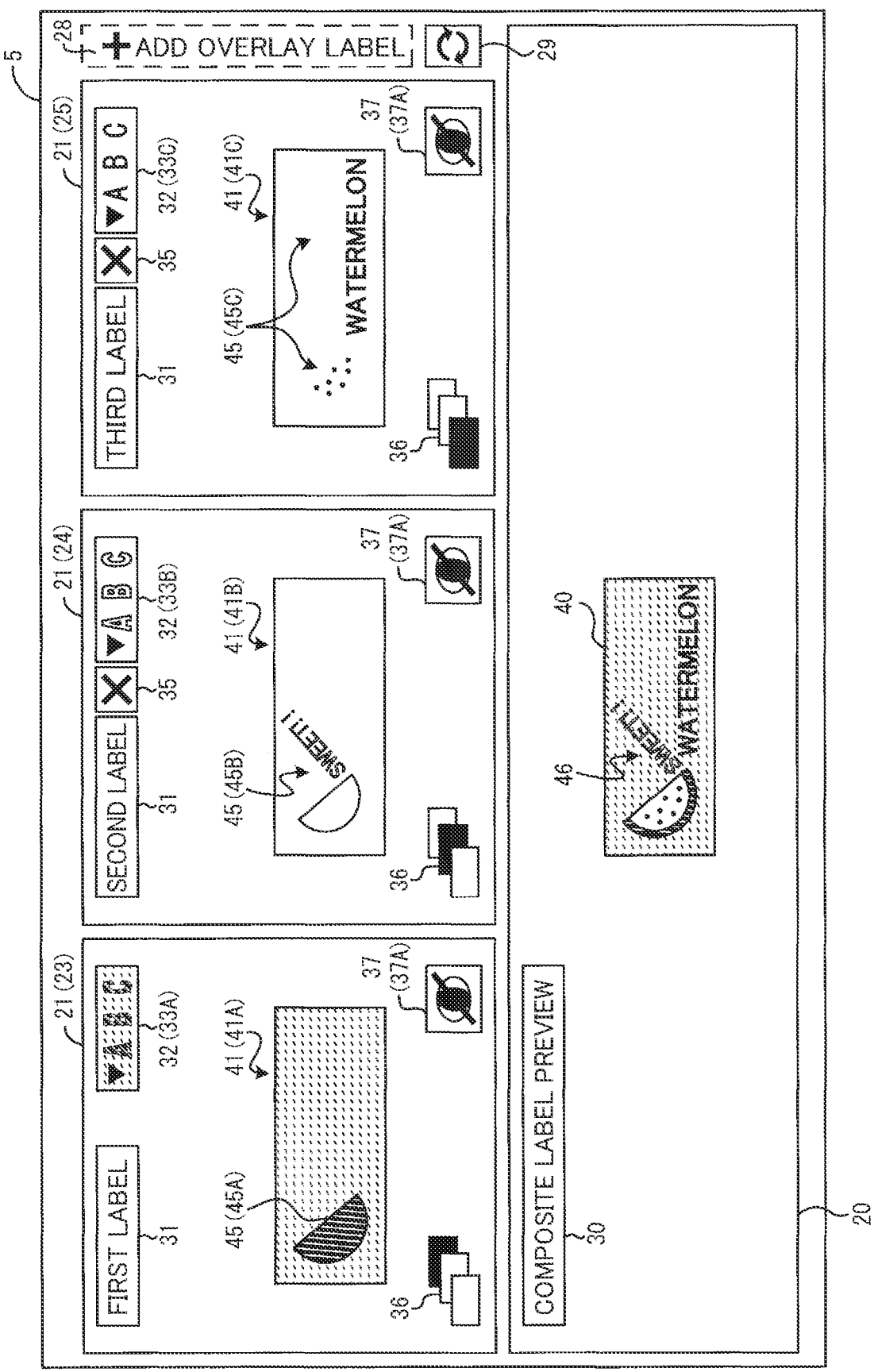
FIG. 19 illustrates a fifth of the editing screen displayed by the display unit of the editing device according to the embodiment of the present disclosure, in which the editing screen has three individual regions including the first region for the first label, the second region for the second label, and the third region for the third label, the region adding button, the switching button, and the composite region, and an object is added to a label image of the third label in the third region.

While the description has been made in detail with reference to specific embodiments, it would be apparent to those skilled in the art that various changes and modifications may be made thereto. In the present embodiment, editing is performed in the editing process to create the composite label 94 that includes the first label 91 and second label 92, but the composite label 94 created in the editing process may include three or more labels. In the editing process described in the embodiment, the editing device 1 enables the user to create and edit a composite label 94 having three or more labels. In this case, the threshold used in S86 corresponds to the first threshold of the present disclosure, and the threshold used in S105 corresponds to the second threshold of the present disclosure. In the example of FIG. 19, an object 45C is added to a label image 41C in the third region 25 through the process in S23 (see FIG. 8). Target color information 33C for the third region 25 is the color record 39 set in 5146 when the third region 25 was added in the overlay addition process (see FIG. 15) or the color record 39 set in S126 of the target color information setting process (see FIG. 14). The composite label image 40 displayed in the composite region 20 is formed by superposing the label images 41A, 41B, and 41C.

The number and structures of devices constituting the printing system 100 may be modified as needed. The editing device 1 of the printing system 100 may be configured to execute printing operations, and the printing system 100 need not be provided with the printing device 50. The printing device 50 may be a printer of a type other than a thermal printer, such as an inkjet printer. The editing device 1 need not be provided with the display unit 3 but may be capable of communicating with a display device separate from the editing device 1, for example. In this case, the CPU 11 may transmit commands to the display device to display various content.

The LCD 4 need not be a device capable of displaying color images. In this case, the display unit 3 should depict colors in an identifiable manner. Specifically, the display unit 3 may display symbols corresponding to colors for each of the label images 41 and the composite label image 40 and may display information mapping the symbols to their corresponding colors. As an alternative to symbols, different colors may be represented using different types of shading, such as diagonal lines, horizontal lines, and vertical lines.

The printing device 50 may be configured to accept a plurality of types of tape cassettes 70 mounted simultaneously. This configuration eliminates the user's need to replace tape cassettes 70 each time the color information changes. The printing device 50 need not be configured to accept the mounting of tape cassettes 70. The tape cassette 70 need not be provided with an ink ribbon 81. Roll paper may be mountable in the printing device 50.

Information for at least one of the tape color and tape transmittance need not be included in the color records 39. The color records 39 may additionally include information on the width of the tape 80. The usage history of the color records 39 may be accumulated in the flash memory 12. In this case, the CPU 11 may display color records 39 in the color information list 34 based on the usage history stored in the flash memory 12 so that the color records 39 used most frequently are readily selectable. The initial color information may be set on the basis of this usage history stored in the flash memory 12. The color information table 97 may be stored in a second flash memory different from the flash memory 12.

In place of the CPU 11, the editing device 1 may employ application-specific integrated circuits (ASICs), field-programmable gate arrays (FPGAs), or the like as the processor. Portions of the editing process may be distributed among a plurality of processors. The non-transitory storage medium may be any storage medium capable of holding information, regardless of the duration that the information is stored. The non-transitory storage medium need not include transitory storage media (conveyed signals, for example). The program may be downloaded from a server connected to the network (i.e., transmitted as a transmission signal) and stored in the flash memory 12, for example. In this case, the program may be saved in a non-transitory storage medium, such as a hard disk drive provided in the server. The variations described above may be combined in any way that does not produce inconsistencies.

Steps may be eliminated from or added to the editing process, and the order of the steps may be modified as needed. The scope of the present disclosure includes a mode in which an operating system (OS) or the like running on the editing device 1 performs some or all of the editing process in response to instructions from the CPU 11. For example, the editing process may be modified as follows.

Steps S2 through S7, S61, and S62 may be omitted from the editing process. That is, the edited data need not be stored in the flash memory 12, and the editing device 1 may perform the editing process only when generating and editing new print data.

The CPU 11 may perform the first color information list creating process in S11 upon receiving a command to set target color information (S30: YES). Similarly, the CPU 11 may execute the overlay color information list creating process in S12 upon receiving a command to set target color information (S30: YES). In this case, the CPU 11 preferably executes the process in S12 when receiving an overlay addition command (S32: YES). The CPU 11 may also perform the switch determination process in S13 upon receiving a switch command (S36: YES). In this case, the process of S13 is preferably performed prior to step S38.

The thresholds used in S86 and S105 may be different values that those indicated in the embodiment. The overlay transmittance may be calculated as the sum of the transmittance for each overlay label.

What is claimed is:

1. A non-transitory computer-readable storage medium storing a set of computer-readable instructions executed by a controller of an editing device, the editing device including: a display; a memory storing the set of computer-readable instructions therein; and the controller, the set of computer-readable instructions, when executed by the controller, causing the editing device to perform:
    displaying, for creating a composite label including a first label and a second label, an editing screen for editing first print data corresponding to the first label and second print data corresponding to the second label on the display, the composite label being created by superposing the first label and the second label, the editing screen having:
        a first region in which a first label image based on the first print data is displayed, the first print data being editable in the first region;
        a second region in which a second label image based on the second print data is displayed, the second print data being editable in the second region; and
        a composite region in which a composite label image is displayed, the composite label image being formed by superposing the first label image and the second label image,
    wherein the displaying displays the composite region, the first region, and the second region separately, independently, and simultaneously on the editing screen,
    wherein in the first region, the first label image is rendered in a format that represents a color corresponding to a first print medium set as a print target for the first print data,
    wherein in the second region, the second label image is rendered in a format that represents a color corresponding to a second print medium set as a print target for the second print data, and
    wherein the first region includes a first setting region for setting the first print medium, and the second region includes a second setting region for setting the second print medium.

2. The non-transitory computer-readable storage medium according to claim 1,
    wherein a color corresponding to a print medium specifies a tape color and an ink color,
    wherein the first print data includes first image data representing a first object image,
    wherein in the first region, the first object image is rendered in an ink color corresponding to the first print medium, and areas other than the first object image are rendered in a format that represents a tape color corresponding to the first print medium,
    wherein the second print data includes second image data representing a second object image, and
    wherein in the second region, the second object image is rendered in an ink color corresponding to the second print medium, and areas other than the second object image are rendered in a format that represents a tape color corresponding to the second print medium.

3. The non-transitory computer-readable storage medium according to claim 2,
    wherein the composite label is created by superposing the second label over the first label, and wherein in the composite region, displayed is the composite label image formed by superposing the second label image over the first label image, in which the second label image is permeabilized in accordance with transmittance of the tape color corresponding to the second print medium such that the first object image is visible therethrough.

4. The non-transitory computer-readable storage medium according to claim 1,
wherein each of the first setting region and the second setting region includes a plurality of options each of which allows selection of one print medium from among a plurality of print media.

5. The non-transitory computer-readable storage medium according to claim 4,
wherein the first setting region includes a plurality of first options corresponding to respective ones of a plurality of first print media, and the second setting region includes a plurality of second options corresponding to respective ones of a plurality of second print media, the plurality of first print media being not the same as the plurality of second print media.

6. The non-transitory computer-readable storage medium according to claim 5,
wherein the plurality of second print media selectable through the plurality of second options in the second setting region does not include a print medium selected in the first setting region.

7. The non-transitory computer-readable storage medium according to claim 6,
wherein the composite label is created by superposing the second label over the first label, and
wherein each of the plurality of second print media has a tape color of which transmittance is greater than or equal to a prescribed threshold.

8. The non-transitory computer-readable storage medium according to claim 1,
wherein in response to the first print data being edited in the first region, the displaying displays in the first region the first label image based on the edited first print data, and displays in the composite region the composite label image formed by superposing the first label image based on the edited first print data and the second label image.

9. An editing device comprising:
a display;
a controller; and
a memory storing a set of computer-readable instructions therein, the set of computer-readable instructions, when executed by the controller, causing the editing device to perform:
displaying, for creating a composite label including a first label and a second label, an editing screen for editing first print data corresponding to the first label and second print data corresponding to the second label on the display, the composite label being created by superposing the first label and the second label, the editing screen having:
a composite region in which a composite label image is displayed, the composite label image being formed by superposing a first label image based on the first print data and a second label image based on the second print data; and
a first region in which the first label image is displayed, the first print data being editable in the first region,
wherein the displaying displays the composite region and the first region separately, independently, and simultaneously on the editing screen,
wherein in the first region, the first label image is rendered in a format that represents a color corresponding to a first print medium set as a print target for the first print data, and
wherein the first region includes a first setting region for setting the first print medium.

10. A method for editing print data executed by a controller of an editing device, the editing device including: a display; and the controller, the method comprising:
displaying, for creating a composite label including a first label and a second label, an editing screen for editing first print data corresponding to the first label and second print data corresponding to the second label on the display, the composite label being created by superposing the first label and the second label, the editing screen having:
a composite region in which a composite label image is displayed, the composite label image being formed by superposing a first label image based on the first print data and a second label image based on the second print data; and
a first region in which the first print label image is displayed, the first print data being editable in the first region,
wherein the displaying displays the composite region and the first region separately, independently, and simultaneously on the editing screen,
wherein in the first region, the first label image is rendered in a format that represents a color corresponding to a first print medium set as a print target for the first print data, and
wherein the first region includes a first setting region for setting the first print medium.

* * * * *